(12) United States Patent
Xu et al.

(10) Patent No.: US 12,328,789 B2
(45) Date of Patent: *Jun. 10, 2025

(54) RADIO RESOURCE CONTROL CONNECTION PROCEDURES FOR REMOTE WIRELESS DEVICES

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN); Longda Xing, San Jose, CA (US); Srinivasan Nimmala, San Jose, CA (US); Srirang A. Lovlekar, Cupertino, CA (US); Sethuraman Gurumoorthy, San Jose, CA (US); Murtaza A. Shikari, Mountain View, CA (US); Sree Ram Kodali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,672

(22) Filed: Apr. 12, 2024

(65) Prior Publication Data

US 2024/0260125 A1 Aug. 1, 2024

Related U.S. Application Data

(63) Continuation of application No. 17/891,296, filed on Aug. 19, 2022, now Pat. No. 11,979,934, which is a
(Continued)

(30) Foreign Application Priority Data

Aug. 13, 2019 (CN) .............................. 201910746189

(51) Int. Cl.
*H04W 76/27* (2018.01)
*H04W 76/18* (2018.01)
(Continued)

(52) U.S. Cl.
CPC ............ *H04W 76/27* (2018.02); *H04W 76/18* (2018.02); *H04W 76/19* (2018.02); *H04W 76/30* (2018.02)

(58) Field of Classification Search
CPC ..... H04W 76/27; H04W 76/18; H04W 76/19; H04W 76/30; H04W 76/14; H04W 88/04; H04W 76/10
See application file for complete search history.

(56) References Cited

U.S. PATENT DOCUMENTS 10,498,431 B2  12/2019  Basu Mallick
10,531,365 B2  1/2020  Kaur
(Continued)

FOREIGN PATENT DOCUMENTS

CN   108029149   5/2018
CN   109328483   2/2019

OTHER PUBLICATIONS

3GPP Standard; Technical Report; 3GPP TR 23.733, 3rd Generation Partnership Project 23.733, 3rd Generation Partnership Project; "3rd Generation Partnership Project; Technical Specification Group Services and System Aspects; Study on Architecture Enhancements to ProSe UE-to-Network Relay (Release 15)"; vol. SA WG2, No. V15.1.0, Dec. 22, 2017.
(Continued)

*Primary Examiner* — Will W Lin
(74) *Attorney, Agent, or Firm* — Kowert, Hood, Munyon, Rankin & Goetzel, P.C.

(57) ABSTRACT

This disclosure relates to techniques for performing radio resource control procedures for remote wireless devices in a
(Continued)

wireless communication system. A remote wireless device may transmit a radio resource control message that includes information configured to be relayed to a cellular base station to a relay wireless device, which may relay the information to the cellular base station. The cellular base station may also transmit a radio resource control message that includes information configured to be relayed to the remote wireless device to the relay wireless device, which may relay the information to the remote wireless device.

20 Claims, 20 Drawing Sheets

Related U.S. Application Data continuation of application No. 16/990,122, filed on Aug. 11, 2020, now Pat. No. 11,457,501.

(51) Int. Cl.
  *H04W 76/19* (2018.01)
  *H04W 76/30* (2018.01)

(56) References Cited

U.S. PATENT DOCUMENTS

| | | | |
|---|---|---|---|
| 10,624,146 | B2 | 4/2020 | Ma |
| 11,146,637 | B2 | 10/2021 | Kitchen |
| 2014/0075189 | A1 | 3/2014 | Abraham |
| 2015/0017976 | A1 | 1/2015 | Liu |
| 2015/0094079 | A1 | 4/2015 | Palat |
| 2015/0282243 | A1* | 10/2015 | Lei ............ H04W 76/19 370/225 |
| 2016/0241325 | A1 | 8/2016 | Raghothaman |
| 2016/0286374 | A1 | 9/2016 | Baghel |
| 2016/0373183 | A1 | 12/2016 | Yi |
| 2017/0295178 | A1* | 10/2017 | Cheng ............ H04W 76/14 |
| 2018/0014296 | A1 | 1/2018 | Li |
| 2018/0092017 | A1 | 3/2018 | Freda |
| 2018/0092027 | A1 | 3/2018 | Sheng |
| 2018/0092150 | A1* | 3/2018 | Tenny ............ H04W 76/16 |
| 2018/0110001 | A1 | 4/2018 | Yasukawa |
| 2018/0199390 | A1* | 7/2018 | Hahn ............ H04B 7/2606 |
| 2018/0279195 | A1* | 9/2018 | Kim ............ H04W 36/22 |
| 2018/0287689 | A1* | 10/2018 | Lee ............ H04W 48/16 |
| 2019/0281526 | A1 | 9/2019 | Freda |
| 2019/0380128 | A1 | 12/2019 | Park |
| 2020/0045626 | A1 | 2/2020 | Kim |
| 2020/0045765 | A1* | 2/2020 | Veeramallu ............ H04W 4/70 |
| 2020/0068431 | A1 | 2/2020 | Han |
| 2020/0084819 | A1 | 3/2020 | Abedini |
| 2020/0120743 | A1 | 4/2020 | Jin |
| 2020/0137637 | A1 | 4/2020 | Xu |
| 2020/0178343 | A1 | 6/2020 | Kim |
| 2020/0196225 | A1 | 6/2020 | Wang |
| 2021/0037503 | A1 | 2/2021 | Nam |
| 2021/0377834 | A1 | 12/2021 | Luo |
| 2021/0410107 | A1 | 12/2021 | Park |
| 2022/0007255 | A1 | 1/2022 | Rugeland |
| 2022/0124697 | A1 | 4/2022 | Yao |
| 2023/0199606 | A1 | 6/2023 | Freda |

OTHER PUBLICATIONS

3GPP Standard; Technical Report; 3GPP TR 36.746, 3RD Generation Partnership Project (3GPP); "3rd Generation Partnership Project; Technical Specification Group Radio Access Network; Study on further enhancements to LTE Device to Device (D2D), User Equipment (UE) to network relays for Internet of Things (IOT) and wearable; (Release 15)"; vol. RAN WG2, No. V15.1.1, Apr. 15, 2018.

3GPP; "3rd Generation Partnership Project; Technical Specification Group Services and System Aspects; Proximity- based services (ProSe); Stage 2 (Release 15), 3GPP TS 23.303 V15.1.0;" Jun. 19, 2018.

Partial European Search Report for Patent Application No. 20190899.3; Jan. 19, 2021.

Extended European Search Report for European Patent application 22201100.9; Jan. 30, 2023.

Extended European Search Report for European Patent Application No. 22201096.9; Feb. 1, 2023.

"3rd Generation Partnership Project; Technical Specification Group Radio Access Network; Evolved Universal Terrestrial Radio Access (E-UTRA); Radio Resource Control (RRC); Protocol specification (Release 15)" 3GPP Draft; 36331-F60; 3rd Generation Partnership Project; Jun. 29, 2019.

Office Action for CN Patent Application No. 201910746189.1; Mar. 1, 2024.

Office Action for CN 202211156044.4; Dec. 23, 2024.

* cited by examiner

RADIO RESOURCE CONTROL CONNECTION PROCEDURES FOR REMOTE WIRELESS DEVICES

PRIORITY DATA

This application is a continuation of U.S. patent application Ser. No. 17/891,296, titled "Radio Resource Control Connection Procedures for Remote Wireless Devices" and filed Aug. 19, 2022, which is a continuation of U.S. patent application Ser. No. 16/990,122, titled "Radio Resource Control Connection Procedures for Remote Wireless Devices" and filed Aug. 11, 2020, now U.S. Pat. No. 11,457,501, issued Sep. 27, 2022, which claims benefit of priority to Chinese Application No. 201910746189.1, titled "Radio Resource Control Connection Procedures for Remote Wireless Devices", filed Aug. 13, 2019, which are both hereby incorporated by reference in their entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

The present application relates to wireless communication, including to radio resource control connection procedures for remote wireless devices in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing radio resource control connection procedures for remote wireless devices in a wireless communication system.

As noted above, the number of use cases for different classes of wireless devices with widely variable capabilities and usage expectations are growing. One direction in which expansion of possible use cases supported by wireless communication techniques may include toward low cost and/or low power consumption wireless devices. Supporting the capability of such wireless devices to establish radio resource control connections and obtain access to a cellular network by way of an intermediate relay wireless device may increase the utility of such low cost and/or low power consumption wireless devices.

Accordingly, the techniques described herein include techniques for a remote wireless device to provide RRC messages to a relay wireless device to be relayed to a cellular base station, for a cellular base station to provide RRC messages to a relay wireless device to be relayed to a remote wireless device, and for a relay wireless device to relay such messages between a cellular base station and a remote wireless device, among other techniques.

Additionally, the techniques described herein include techniques for detecting link failure and link failure handling in conjunction with a remote radio resource control connection, both for a wireless link between a remote wireless device and a relay wireless device, and for a wireless link between a relay wireless device and a cellular base station.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
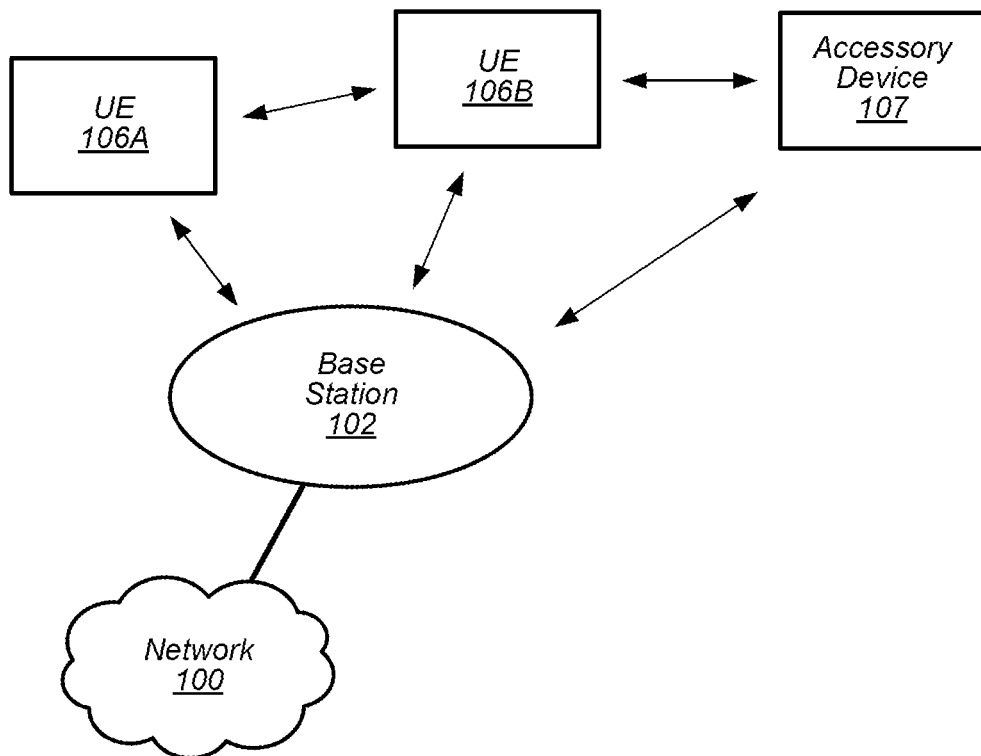
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
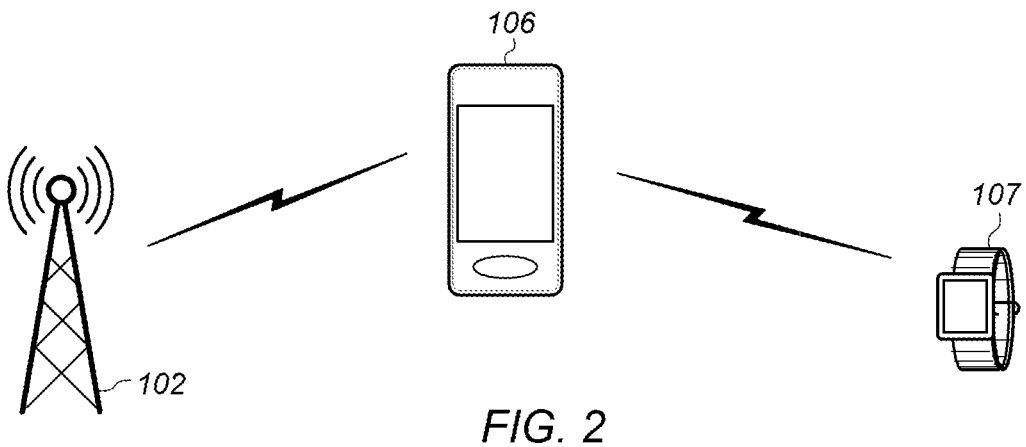
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, cHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
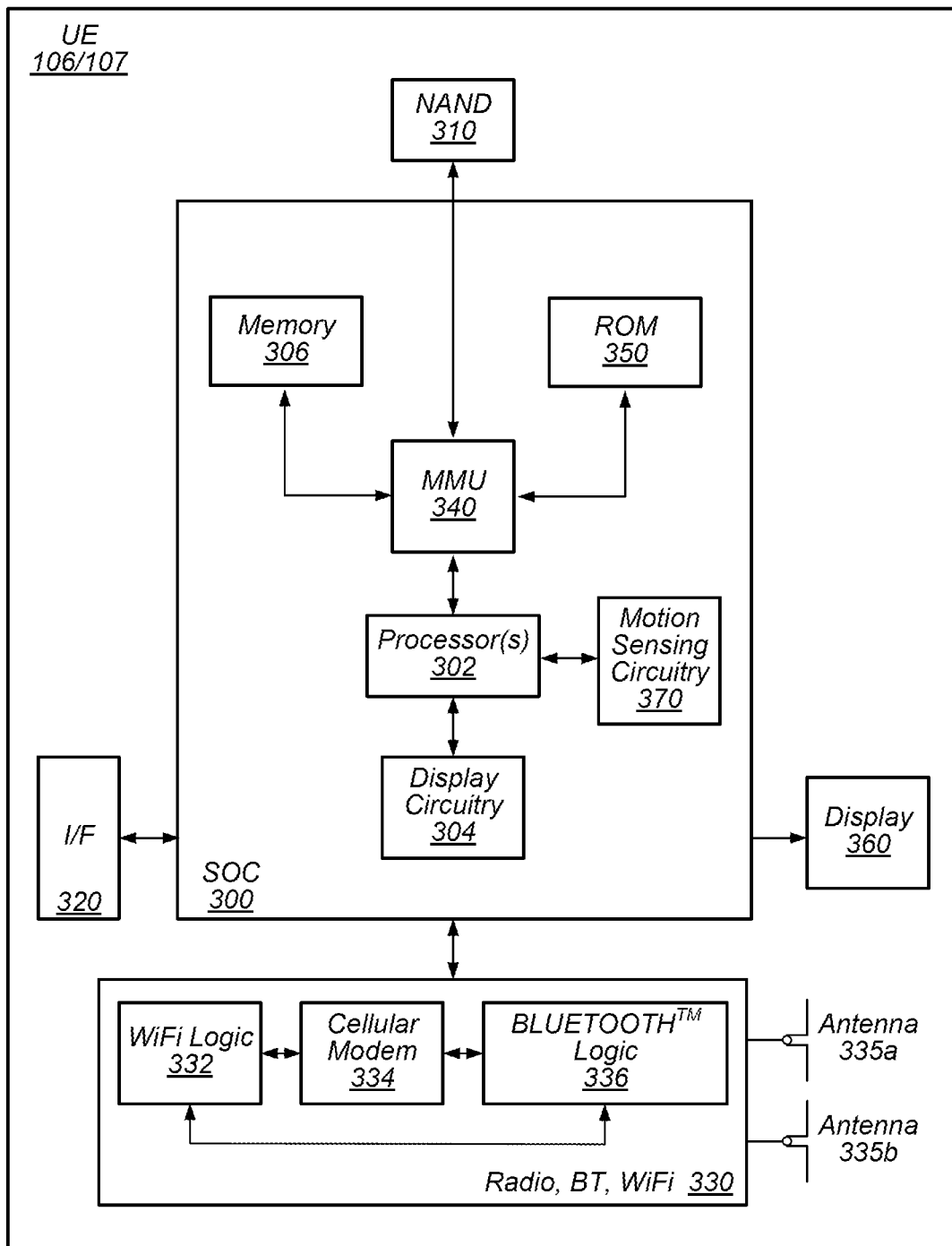
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
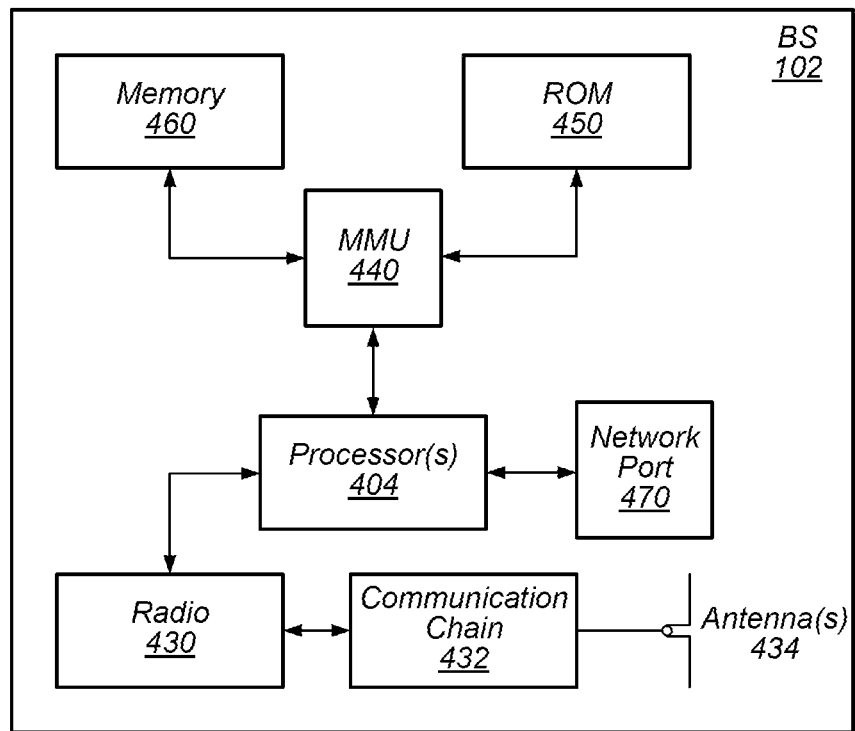
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
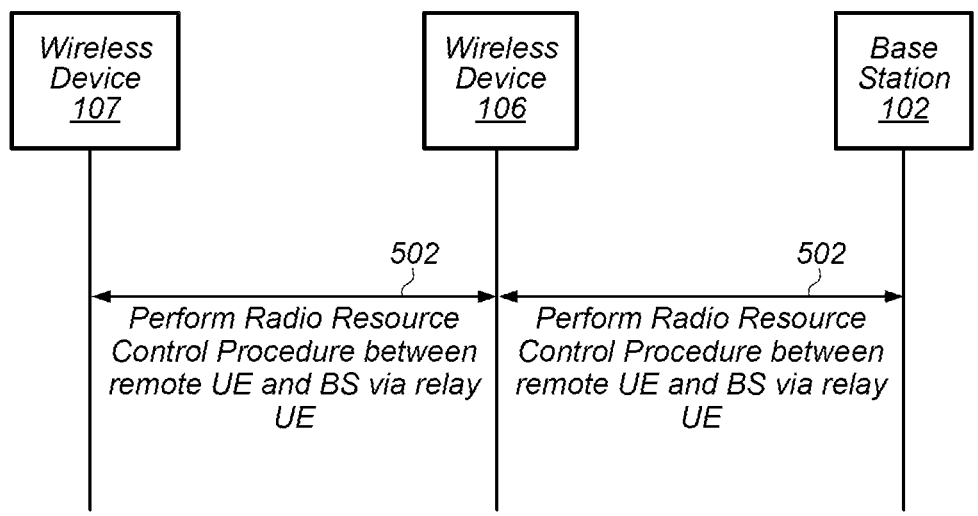
FIG. 5 is a communication flow diagram illustrating an exemplary method for performing presence discovery in a wireless communication system, according to some embodiments.

FIG. 5—Communication Flow Diagram

FIG. 5 is a communication flow diagram illustrating a method for performing radio resource control procedures for remote wireless devices in a wireless communication system, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device and/or a cellular base station, such as the UEs 106A-B or 107 and/or BS 102 illustrated in and described with respect to FIGS. 1-4, or more generally in conjunction with any of the computer systems or devices shown in the above Figures, among other devices, as desired. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

In 502, a wireless device (a "first wireless device" or a "remote wireless device") 107 may perform a radio resource control (RRC) procedure with a cellular base station 102 via another wireless device (a "second wireless device" or a "relay wireless device") 106. The remote wireless device may be any of various types of wireless devices that is capable of performing wireless communication with a cellular base station indirectly via an intermediate relay wireless device. As one possibility, the remote wireless device may be an accessory device, such as a smart watch or other wearable device that is configured to be a low cost and/or low power consumption wireless device. The relay wireless device may be any of various types of wireless devices that is capable of supporting wireless communication between a remote wireless device and a cellular base station by acting as an intermediate relay wireless device. As one possibility, the relay wireless device may be a smart phone capable of acting as a companion device to the remote wireless device. Numerous other types of wireless devices are also possible as the remote wireless device and/or the relay wireless device. The cellular base station may be any of various types of base stations that is capable of performing wireless communication with a remote wireless device indirectly via an intermediate relay wireless device, and that is capable of providing access to a cellular network. As one possibility, the cellular base station may be a 3GPP 5G NR gNB. Alternatively (or additionally), the cellular base station may be capable of operating in accordance with any of various other possible cellular communication standards.

The RRC procedure may include any of various RRC procedures. At least according to some embodiments, the RRC procedure may be used to attempt establish a RRC connection between the remote wireless device and the cellular base station. For example, the remote wireless device may attempt to perform a RRC connection procedure, a RRC reestablishment procedure, or a RRC resume procedure. As further possibilities, the RRC procedure may be used to reconfigure an existing RRC connection between the remote wireless device and the cellular base station (for example, the cellular base station may attempt to perform a RRC reconfiguration procedure), or may be used to release an existing RRC connection between the remote wireless device and the cellular base station (for example, the cellular base station may attempt to perform a RRC release procedure).

In order to perform the RRC procedure, the relay wireless device may relay RRC messages between the remote wireless device and the cellular base station. For example, to perform a RRC connection procedure, the remote wireless device may transmit a RRC connection request to the relay wireless device, which may in turn transmit a RRC connection request to the cellular base station on behalf of the remote wireless device. The cellular base station may transmit a RRC setup message configured to facilitate RRC connection setup with the remote wireless device to the relay wireless device in response to the RRC connection request. The relay wireless device may in turn transmit a RRC setup message to the remote wireless device on behalf of the cellular base station, e.g., including configuration information for establishing the RRC connection. The remote wireless device may further transmit a RRC setup complete message to the relay wireless device, which may in turn transmit a RRC setup complete message to the cellular base station on behalf of the remote wireless device.

Note that the RRC messages relayed between the remote wireless device and the cellular base station by the relay wireless device may differ for different RRC procedures. According to some embodiments, some or all of the RRC messages may be relayed in full by the relay wireless device. As another possibility, some or all of the RRC message content may not be relayed, and/or additional information may be added to some or all relayed RRC messages. For example, in some instances, the configuration information for establishing a remote RRC connection may include some information that is used by the relay wireless device to establish one or more relay signaling radio bearers between the relay wireless device and the cellular base station, that may not be needed by the remote wireless device to establish the remote RRC connection.

As another possibility, the relay wireless device may provide identification information associated with the remote wireless device to the cellular base station when providing RRC messages to the cellular base station on behalf of the remote wireless device, e.g., to indicate to the cellular base station that the RRC messages are being provided on behalf of the remote wireless device, and similarly, the cellular base station may provide identification information associated with the remote wireless device to the relay wireless device when providing RRC messages to the relay wireless device on behalf of the remote wireless device, e.g., to indicate to the relay wireless device that the RRC messages are being provided on behalf of the remote wireless device. Providing such identification information may be useful to differentiate RRC messages relating to the RRC connection between the relay wireless device and the cellular base station from RRC messages relating to the RRC connection between the remote wireless device and the cellular base station, in some instances. Such differentiation may also be possible by using different signaling radio bearers for relayed RRC messages than for RRC messages relating to the RRC connection between the relay wireless device and the cellular base station. Providing such identification information may further be useful for identifying which RRC messages relate to which RRC connections in case the relay wireless device is configured to relay RRC messages between the cellular base station and each of multiple remote wireless devices; for example, in such a scenario, it may be the case that each RRC message relayed between the cellular base station and a respective remote wireless device includes remote wireless device identification information for the respective remote wireless device.

At least according to some embodiments, the relay wireless device may transmit a discovery broadcast message (e.g., based on an event-driven or periodic trigger) indicating that the relay wireless device supports relaying RRC messages. The remote wireless device may receive the discovery broadcast message from the relay wireless device (and potentially may receive discovery broadcast messages from one or more other wireless devices capable of supporting relaying RRC messages). The remote wireless device may perform link selection to determine a wireless link on which to attempt to establish a relayed RRC connection with a cellular base station, and may select the relay wireless device based at least in part on the discovery broadcast message received from the relay wireless device. The remote wireless device may attempt to perform the RRC procedure with the cellular base station via the relay wireless device based at least in part on the link selection.

Since the remote RRC connection may rely on multiple wireless links (e.g., the wireless link between the remote wireless device and the relay wireless device, and the wireless link between the relay wireless device and the cellular base station), it may be beneficial to provide techniques for handling wireless link breakage. According to some embodiments, one or both of the remote wireless device or the relay wireless device may utilize response timers to help determine if link failure of the wireless link between the remote wireless device and the relay wireless device occurs. For example, the relay wireless device may initiate a response validity timer based at least in part on relaying a radio resource control message to the remote wireless device, and may stop the response validity timer when a response is received from the remote wireless device. If the response validity timer expires with no response having been received, the relay wireless device may determine that link failure of the wireless link between the relay wireless device and the remote wireless device has occurred. If the relay wireless device determines that link failure of the wireless link between the relay wireless device and the remote wireless device has occurred, e.g., in such a way or in any of various other ways, the relay wireless device may provide an indication of the link failure of the wireless link between the relay wireless device and the remote wireless device to the cellular base station. At least in some instances, the relay wireless device may receive an indication from the cellular base station to release the remote wireless device in response to the indication of the link failure of the wireless link between the relay wireless device and the remote wireless device.

In some embodiments, the remote wireless device may initiate a response guard timer based at least in part on providing a radio resource control message to the relay wireless device, and may stop the response guard timer when a response to the radio resource control message is received from the relay wireless device. If the response guard timer expires with no response having been received, the remote wireless device may determine that link failure of the wireless link between the remote wireless device and the relay wireless device has occurred. In such a scenario, the remote wireless device may perform link selection to determine a wireless link on which to attempt to establish a relayed radio resource control connection with the cellular base station, e.g., based at least in part on the link failure of the wireless link between the remote wireless device and the relay wireless device.

According to some embodiments, acknowledgements may generally be provided in response to RRC messages communicated as part of a remote RRC procedure (e.g., the relay signaling radio bearers used may be configured in acknowledged mode or AM). Based on such acknowledgements (or lack thereof) and/or in any of various other ways, the relay wireless device may also be able to determine if link failure of a wireless link between the relay wireless device and the cellular base station occurs. If such a link failure is detected, the relay wireless device may provide an indication of the link failure of the wireless link between the relay wireless device and the cellular base station to the remote wireless device. The indication may include any of an explicit indication that the link failure of the wireless link between the relay wireless device and the cellular base station has occurred, an indication to suspend the wireless link between the relay wireless device and the remote wireless device, or an indication to release the wireless link between the relay wireless device and the remote wireless device. Based on the indication (e.g., if an indication to release the wireless link between the first wireless device and the second wireless device is received), the remote wireless device may perform link selection to determine anew a wireless link on which to attempt to establish a relayed radio resource control connection with the cellular base station. Alternatively (e.g., if an indication to suspend the wireless link between the relay wireless device and the remote wireless device is received), the remote wireless device may wait for up to a certain amount of time before performing link selection, e.g., in case the relay wireless device is able to reestablish a wireless link with the cellular network and resume relaying RRC messages with the cellular network on behalf of the remote wireless device.

Thus, using the techniques described herein, it may be possible for a remote wireless device to establish and manage a RRC connection with a cellular network via a relay wireless device, and for the remote wireless device, the relay wireless device, and the cellular network to handle potential link failure of the wireless links used to support the remote RRC connection. Such techniques may be useful for supporting cellular communication for a broader range of types of wireless devices, e.g., potentially helping to extend the range of possible wireless devices capable of utilizing cellular communication further towards lower cost and/or lower power consumption wireless devices, among other possible benefits, at least according to some embodiments.

FIGS. 6-23 and Additional Information

FIGS. 6-23 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
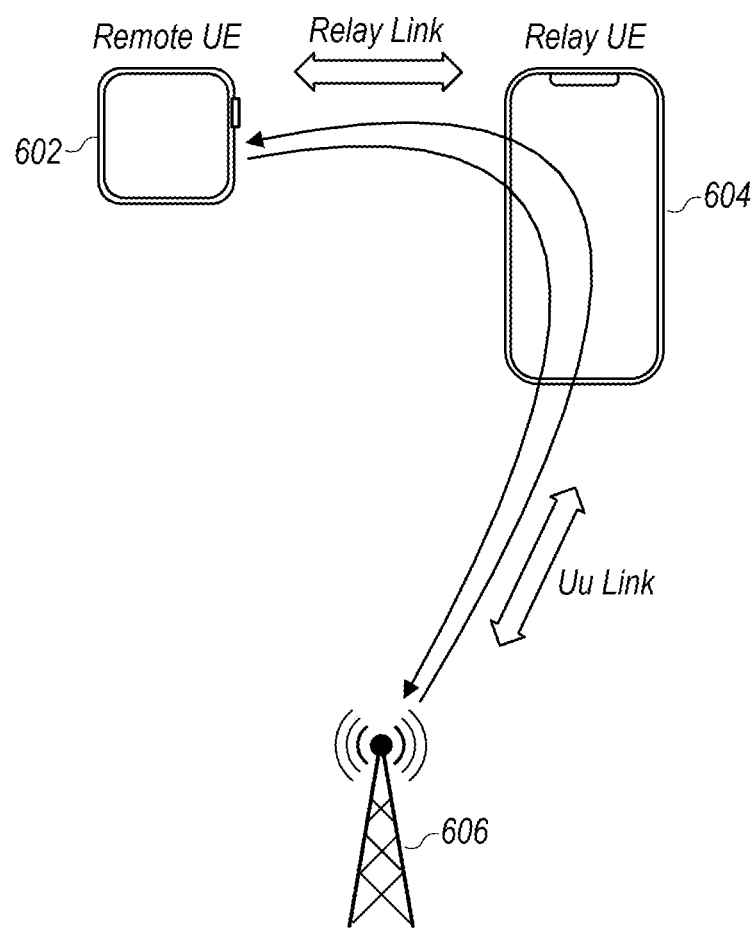
FIG. 6 illustrates aspects of a possible wireless communication relay between a remote UE, a relay UE, and a gNB, according to some embodiments.

3GPP 5G NR cellular communication techniques are being developed for a variety of use cases, including enhanced mobile broadband (eMBB), ultra reliable low latency communications (URLLC), and massive machine type communication (mMTC). The mMTC use case may include widespread deployment of wireless devices designed to have relatively low cost and/or low power consumption. Such devices may include wearable devices, appliances, process control devices, measurement devices, and/or any of a variety of other types of devices. In at least some embodiments (e.g., wearable devices, in some instances), it may be the case that such a device may commonly be within relatively close proximity to another wireless device (e.g., a smart phone, in some instances) that can serve as a relay for communications with a cellular network. Accordingly, it may be beneficial, at least in some embodiments, to support a UE to NW communication relay framework, e.g., to help support operation of low cost and/or low power consumption wireless devices that may be capable of benefiting from such a framework. For example, FIG. 6 illustrates aspects of one possible example wireless communication relay between a remote UE 602, a relay UE 604, and a cellular base station 606. As shown, in the illustrated scenario the remote UE 602 may be able to communicate with the cellular base station 606 by way of a relay link between the remote UE 602 and the relay UE 604 as well as a Uu link between the relay UE 604 and the cellular base station 606.

Figure 7:
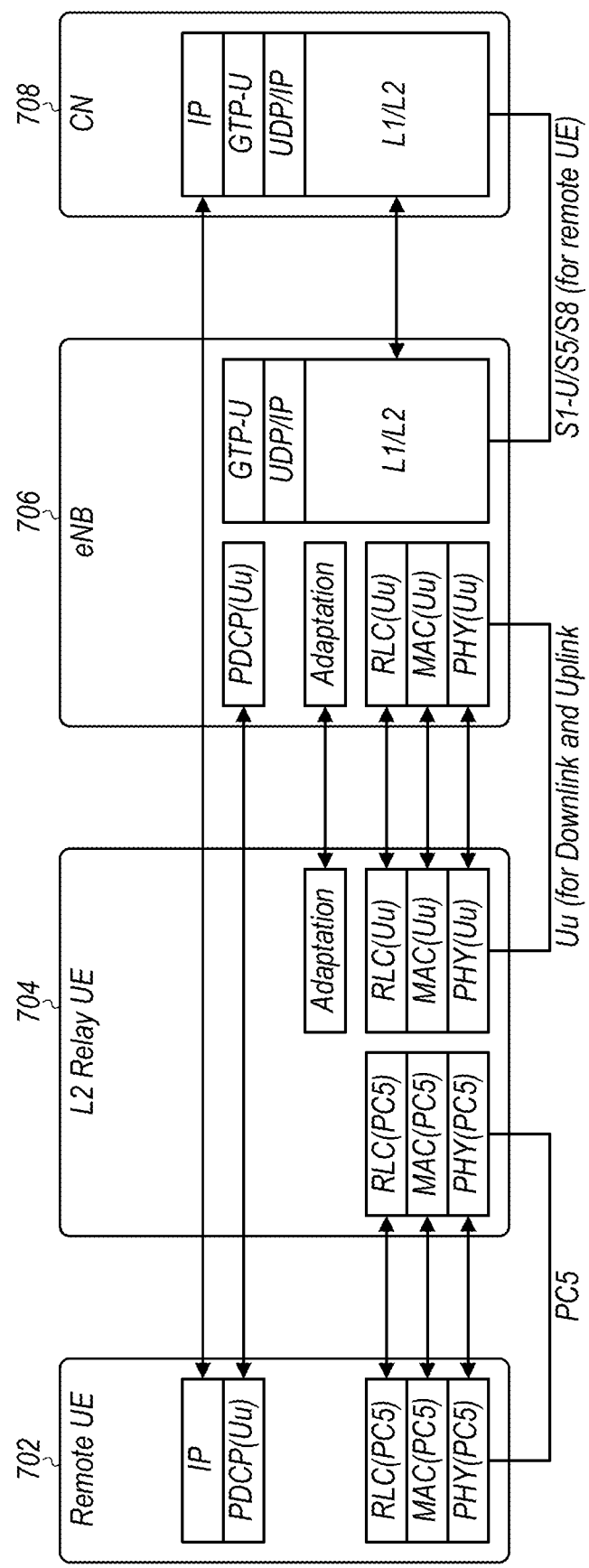
FIGS. 7-8 illustrate exemplary aspects of possible protocol stack architectures for user plane and control plane communications in a 3GPP based UE-to-network relay framework, according to some embodiments.
Figure 8:
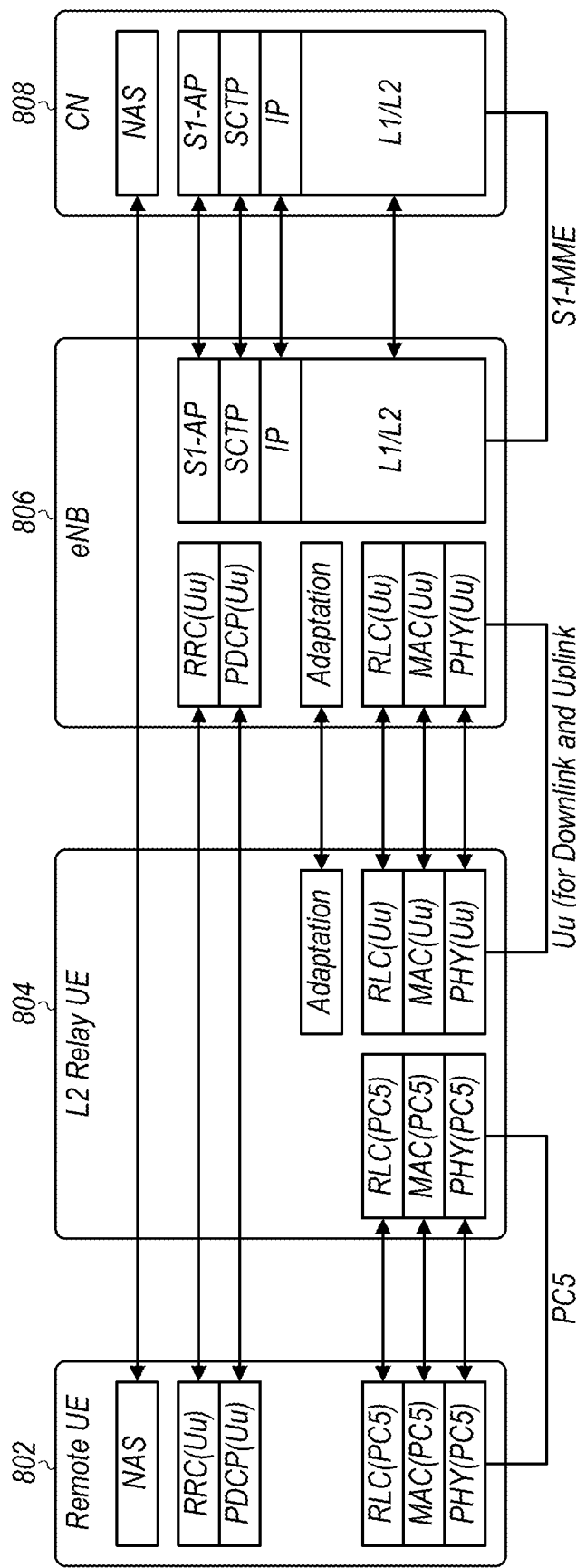

According to various embodiments, there may be multiple possible types of UE to NW relay frameworks. As one possibility, a layer 3 relay may be used, which may be implemented without impact to access stratum communication layers, at least in some instances. As another possibility, a layer 2 relay may be used, for example by establishing and maintaining a radio resource control connection that is terminated between the remote UE and the cellular base station. FIGS. 7-8 illustrate exemplary aspects of possible protocol stack architectures for user plane and control plane communications in a 3GPP based UE-to-network relay framework in which the communication relay is implemented at layer 2, according to some embodiments.

More particularly, FIG. 7 illustrates the user plane radio protocol stack for a layer 2 UE to network relay that utilizes a PC5 interface between a remote UE 702 and a relay UE 704 to provide a communication link between the remote UE 702 and an eNB 706, and to a core network 708 to which the eNB 706 provides access. Similarly, FIG. 8 illustrates the control plane radio protocol stack for a layer 2 UE to network relay that utilizes a PC5 interface between a remote UE 802 and a relay UE 804 to provide a communication link between the remote UE 802 and an eNB 806, and to a core network 808 to which the eNB 806 provides access. As shown, the relaying may be performed above the RLC sublayer. The Uu PDCP and RRC links may be terminated between the remote UE and the eNB, while RLC, MAC, and PHY, and the non-3GPP transport layers, are terminated in each link (e.g., the link between the remote UE and the relay UE, and the link between the relay UE and the eNB).

Currently, RRC connection procedures may be performed between a UE and a network via a direct connection over a Uu interface, e.g., in accordance with 3GPP based cellular communication. For a RRC connection procedure between a remote UE, in which the peer RRC entity is terminated at the remote UE and at the network, the RRC message transmission may be forwarded via a relay UE, e.g., such that there may be an additional relay link between the relay UE and the remote UE in addition to a Uu link between the relay UE and the network. Since the Uu link and the relay link may be maintained independently, it may be possible for a remote RRC procedure to fail due to breakage of either the relay link or the Uu link. Accordingly, it may be important to carefully design a RRC procedure framework to support remote UEs' capability to perform RRC procedures.

According to some embodiments, a remote UE's RRC message delivery via a Uu link may be performed via relay signaling radio bearers (SRBs) that are established between the network and the relay UE. The network may be able to establish one or multiple relay SRBs. It may be the case that all relay SRBs are configured in radio link control (RLC) acknowledged mode (AM). In the case that multiple relay SRBs are used, different relay SRBs may be used for different types of signaling. For example, as one possibility, a relay SRB0 could be used for 3GPP SRB0 transmission, a relay SRB1 could be used for 3GPP SRB1 transmission, and a relay SRB2 could be used for 3GPP SRB2 transmission. Note that other configurations are also possible. The relay SRB(s) may be common for all remote UEs that have established relay links with a given relay UE. It may be the case that each RRC message of a remote UE is transmitted together with a remote UE identifier, e.g., in order to distinguish different remote UE's RRC messages within one relay SRB.

As noted previously herein, link failure detection may be an important consideration for supporting remote RRC procedures. For a two-way RRC procedure (e.g., in which a response to each message of the RRC procedure is expected), the relay UE may be able to utilize a response validity timer to control the RRC response message from the remote UE over the relay link. For example, the relay UE may start the response validity timer when sending the RRC message to the remote UE, and stop the timer when the relay UE receives the expected RRC response from the remote UE. Upon timer expiry (e.g., if no RRC response is received from the remote UE while the timer is running), the relay UE may determine that RRC message transmission via the relay link has failed.

For each possible RRC procedure, if the relay UE can detect that RRC message transmission failure has occurred (e.g., either in the relay link or the Uu link), the relay UE may take action in response to the RRC message transmission failure. For example, for the relay link failure case, the relay UE may inform the network of the relay link failure. For the Uu link failure case, the relay UE may provide information to the remote UE based on the Uu link failure, which may facilitate the remote UE performing link reselection. For example, the relay UE may send an indication of the Uu link failure to the remote UE, as one possibility. As another possibility, the relay UE may send an indication to suspend the relay link to all remote UEs that have a relay link established with the relay UE. As a still further possibility, the relay UE may close the relay link with the remote UE directly (e.g., possibly without explicitly indicating that the Uu link failure has occurred.

Figure 9:
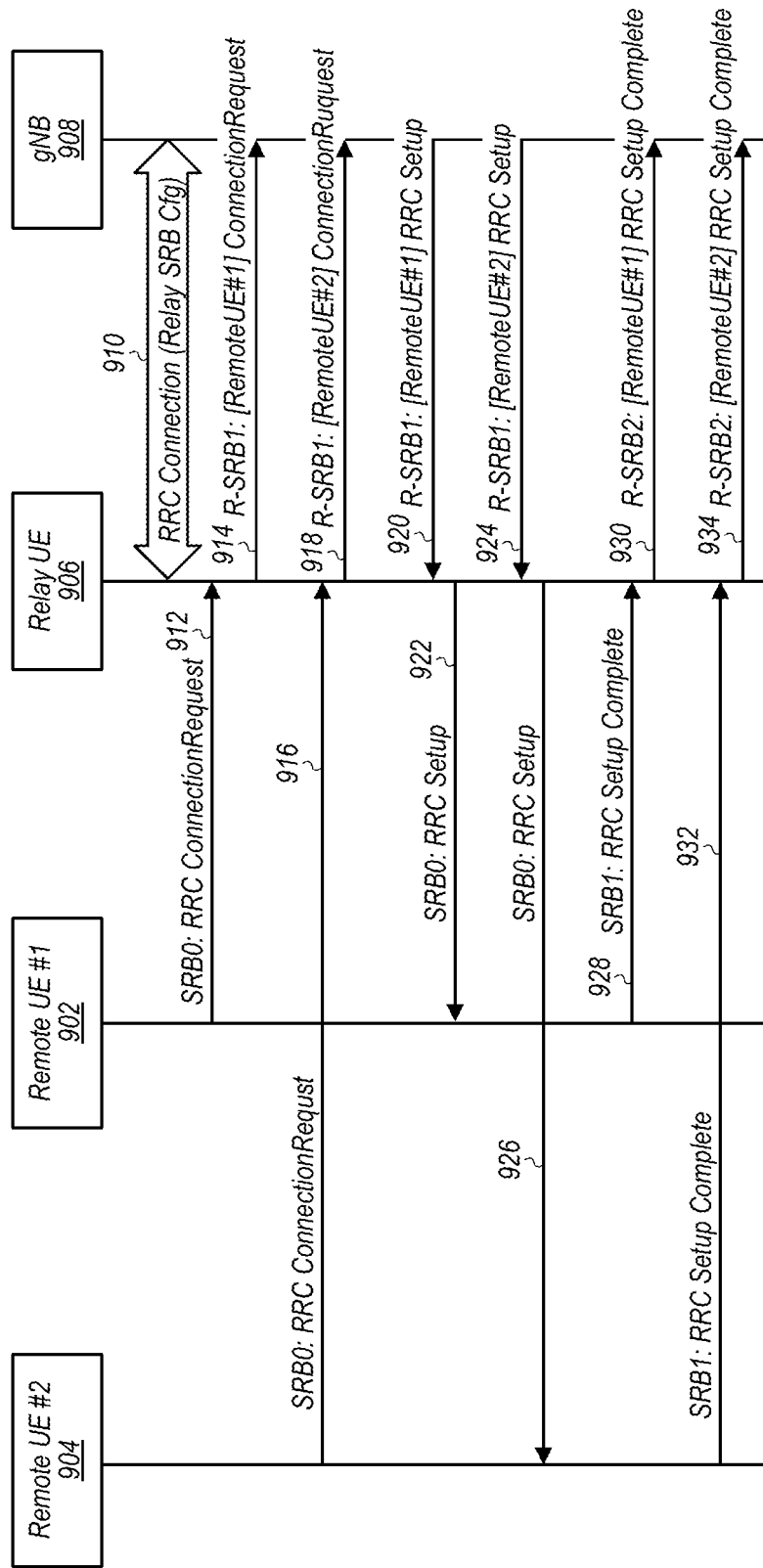
FIG. 9 is a signal flow diagram illustrating aspects of an example scenario in which multiple remote UEs attempt to establish a RRC connection with a gNB via the same relay UE, according to some embodiments.

FIGS. 9-14 are signal flow diagrams illustrating further details of various possible remote RRC procedures. FIG. 9 illustrates aspects of an example scenario in which multiple remote UEs attempt to establish a RRC connection with a gNB via the same relay UE, according to some embodiments. In the example scenario, the remote UEs' RRC message delivery in the Uu link may be carried on relay SRBs that are established between the relay UE and the network.

As shown, in the illustrated scenario, in 910, a relay UE 906 may establish a RRC connection with a gNB 908, potentially including establishing a relay SRB configuration. This may include the network establishing a relay SRB1 for remote UEs' SRB0 transmissions, and a relay SRB2 for remote UEs' SRB1 and SRB2 transmission. In 912, a first remote UE 902 may provide a RRC connection request to the relay UE 906. In 914, the relay UE 906 may provide a connection request to the gNB 908 on behalf of the first remote UE 902, e.g., including identification information for the first remote UE 902. The connection request may be provided using the relay SRB1, e.g., since it may be relaying a SRB0 transmission from the first remote UE 902. In 916, a second remote UE 904 may provide a RRC connection request to the relay UE 906. In 918, the relay UE 906 may provide a connection request to the gNB 908 on behalf of the second remote UE 904, e.g., including identification information for the second remote UE 904. The connection request may be provided using the relay SRB1, e.g., since it may be relaying a SRB0 transmission from the first remote UE 902.

In 920, the gNB 908 may provide a RRC setup message that is intended for the first remote UE 902 to the relay UE 906. The RRC setup message that is intended for the first remote UE 902 may include identification information for the first remote UE 902. In 922, the relay UE 906 may provide a RRC setup message to the first remote UE 902 on behalf of the gNB 908. Similarly, in 924, the gNB 908 may provide a RRC setup message that is intended for the second remote UE 904 to the relay UE 906. The RRC setup message that is intended for the second remote UE 904 may include identification information for the second remote UE 904. In 926, the relay UE 906 may provide a RRC setup message to the second remote UE 904 on behalf of the gNB 908. Note that for both RRC setup messages provided by the gNB 908, the relay SRB1 may again be used.

In 928, the first remote UE 902 may provide a RRC setup complete message to the relay UE 906. In 930, the relay UE 906 may provide a RRC setup complete message to the gNB 908 on behalf of the first remote UE 902, e.g., including identification information for the first remote UE 902. The RRC setup complete message may be provided using the relay SRB2, e.g., since it may be relaying a SRB1 transmission from the first remote UE 902. In 932, the second remote UE 904 may provide a RRC setup complete message to the relay UE 906. In 934, the relay UE 906 may provide a RRC setup complete message to the gNB 908 on behalf of the second remote UE 904, e.g., including identification information for the second remote UE 904. The RRC setup complete message may be provided using the relay SRB2, e.g., since it may be relaying a SRB1 transmission from the second remote UE 904. Note that it may be possible for different types of remote UE identification information to be used for different SRBs. For example, for a SRB0 transmission, the remote UE identification information may be allocated by the relay UE, while for the SRB1 transmission, the remote UE identification may include full or partial cell radio network temporary identifier (C-RNTI) information.

Figure 10:
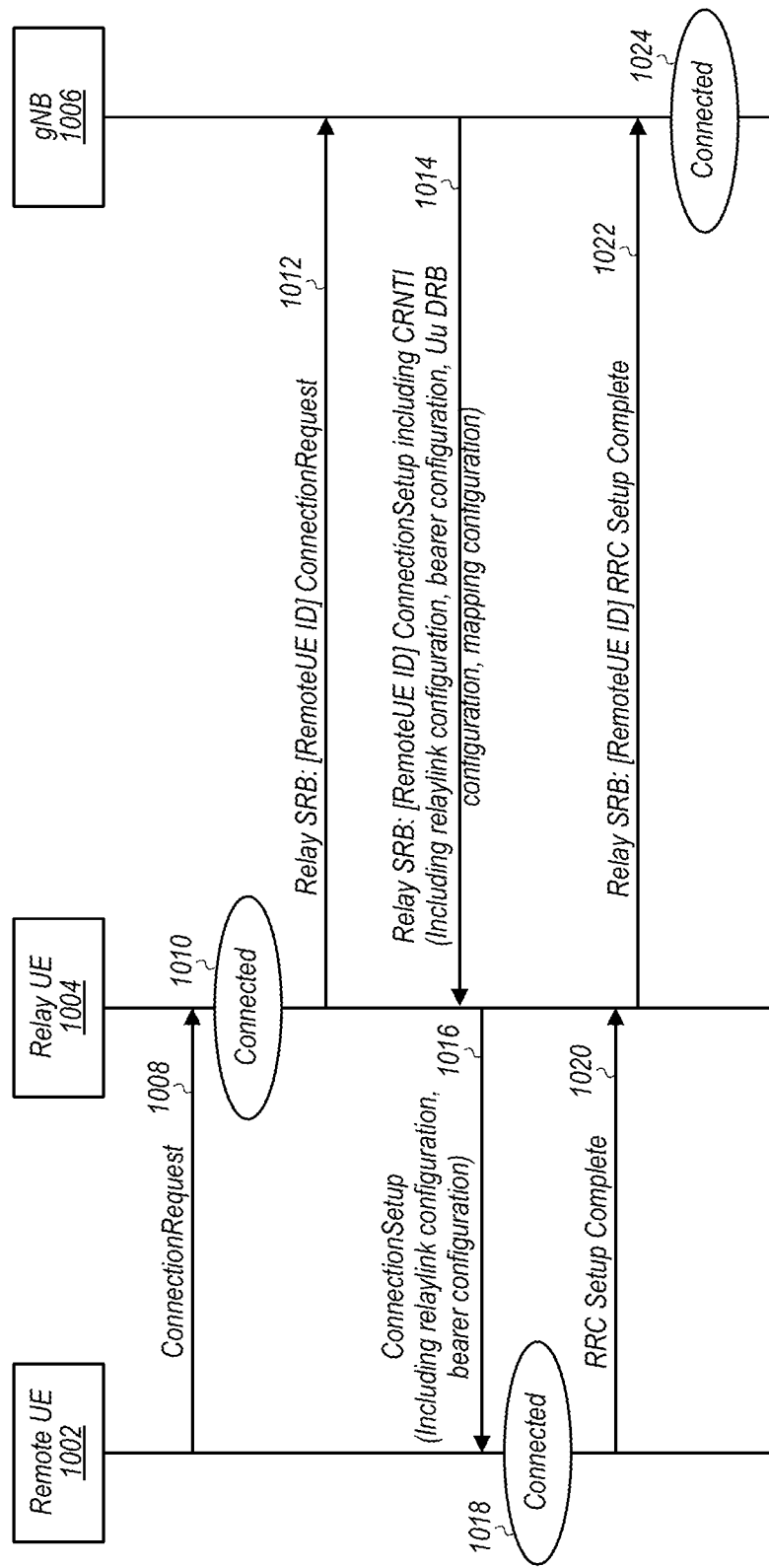
FIG. 10 is a signal flow diagram illustrating aspects of an example scenario in which a single remote UE attempts to establish a RRC connection with a gNB via a relay UE, according to some embodiments.

FIG. 10 illustrates aspects of an example scenario in which a single remote UE attempts to establish a RRC connection with a gNB via a relay UE, according to some embodiments. As shown, in the illustrated scenario, in 1008, a remote UE 1002 may provide a RRC connection request to a relay UE 1004. In 1010, the remote UE 1002 and the relay UE 1004 may be connected. In 1012, the relay UE 1004 may provide a RRC connection request to a gNB 1006 using a relay SRB and indicating identification information for the remote UE 1002. In 1014, the gNB 1006 may provide a RRC connection setup message to the relay UE 1004 using the relay SRB. The RRC connection setup message may include C-RNTI information for the remote UE 1002, as well as relay link configuration information, bearer configuration information, Uu data radio bearer configuration information, mapping configuration information, and/or any of various information in support of establishing a remote RRC connection between the gNB 1006 and the remote UE 1002. In 1016, the relay UE 1004 may provide a RRC connection setup message to the remote UE 1002, including at least some of the information received from the gNB 1006, such as any information needed by the remote UE 1002 as part of establishing the remote RRC connection between the gNB 1006 and the remote UE 1002 (e.g., relay link configuration information, bearer configuration information). In 1018, the remote UE 1002 may be connected with the gNB 1006. In 1020, the remote UE 1002 may complete the RRC connection establishment with the gNB 1006 by providing a RRC setup complete message to the relay UE 1004, and in 1022, the relay UE 1004 may provide a RRC setup complete message to the gNB 1006 using the relay SRB and indicating identification information for the remote UE 1002. In 1024, the gNB 1006 may also be connected with the remote UE 1002.

Figure 11:
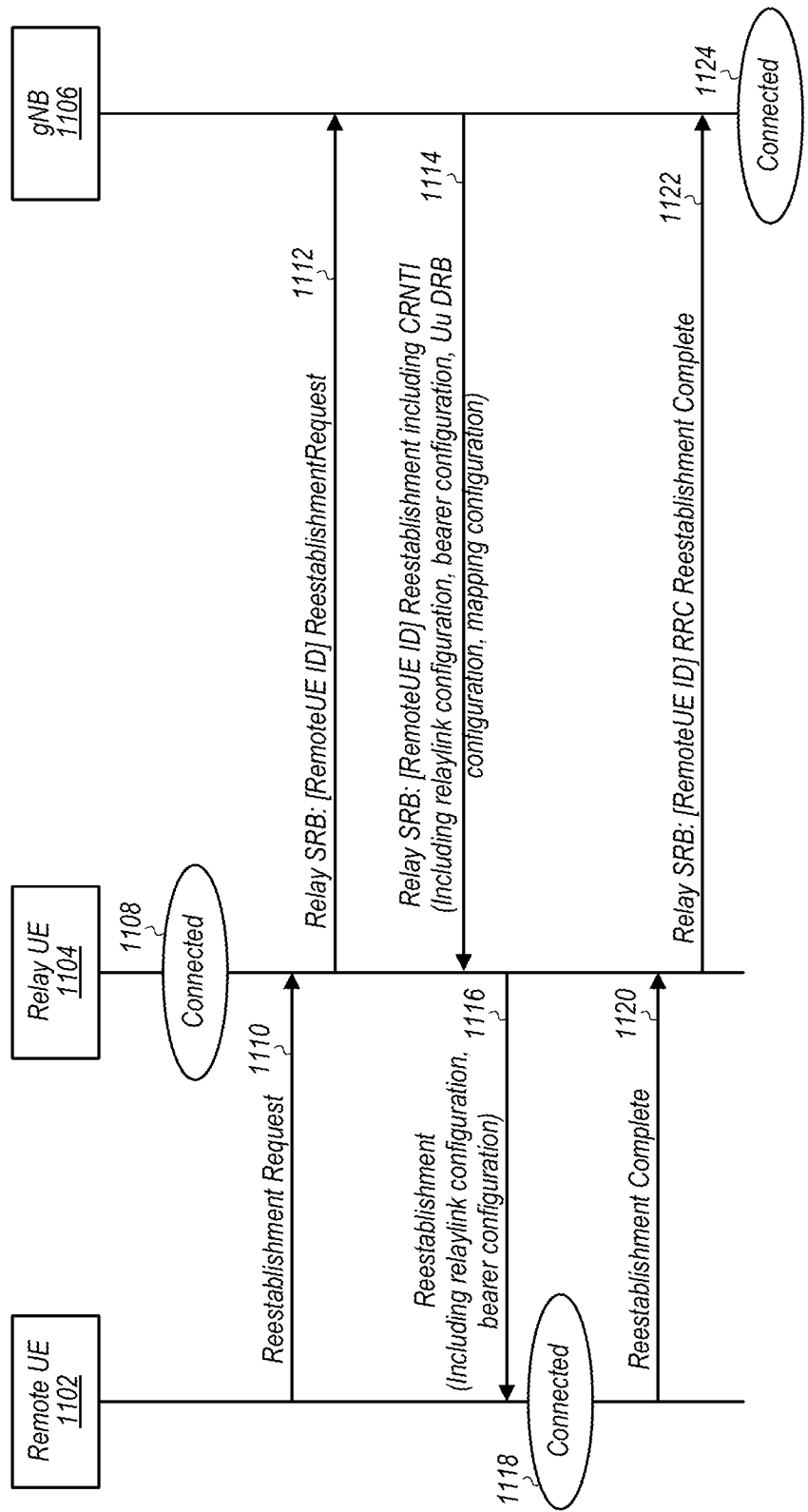
FIG. 11 is a signal flow diagram illustrating aspects of an example scenario in which a single remote UE attempts to reestablish a RRC connection with a gNB via a relay UE, according to some embodiments.

FIG. 11 illustrates aspects of an example scenario in which a single remote UE attempts to reestablish a RRC connection with a gNB via a relay UE, according to some embodiments. As shown, in the illustrated scenario, in 1108, a remote UE 1102 and a relay UE 1104 may be connected. In 1110, the remote UE 1102 may provide a RRC reestablishment request to the relay UE 1104. In 1112, the relay UE 1104 may provide a RRC reestablishment request to a gNB 1106 using a relay SRB and indicating identification information for the remote UE 1102. In 1114, the gNB 1106 may provide a RRC reestablishment message to the relay UE 1104 using the relay SRB. The RRC reestablishment message may include C-RNTI information for the remote UE 1102, as well as relay link configuration information, bearer configuration information, Uu data radio bearer configuration information, mapping configuration information, and/or any of various information in support of reestablishing a remote RRC connection between the gNB 1106 and the remote UE 1102. In 1116, the relay UE 1004 may provide a RRC reestablishment message to the remote UE 1102, including at least some of the information received from the gNB 1106, such as any information needed by the remote UE 1102 as part of reestablishing the remote RRC connection between the gNB 1106 and the remote UE 1102 (e.g., relay link configuration information, bearer configuration information). In 1118, the remote UE 1102 may be connected with the gNB 1106. In 1120, the remote UE 1102 may complete the RRC connection reestablishment with the gNB 1106 by providing a RRC reestablishment complete message to the relay UE 1104, and in 1122, the relay UE 1104 may provide a RRC reestablishment complete message to the gNB 1106 using the relay SRB and indicating identification information for the remote UE 1102. In 1124, the gNB 1106 may also be connected with the remote UE 1102.

Figure 12:
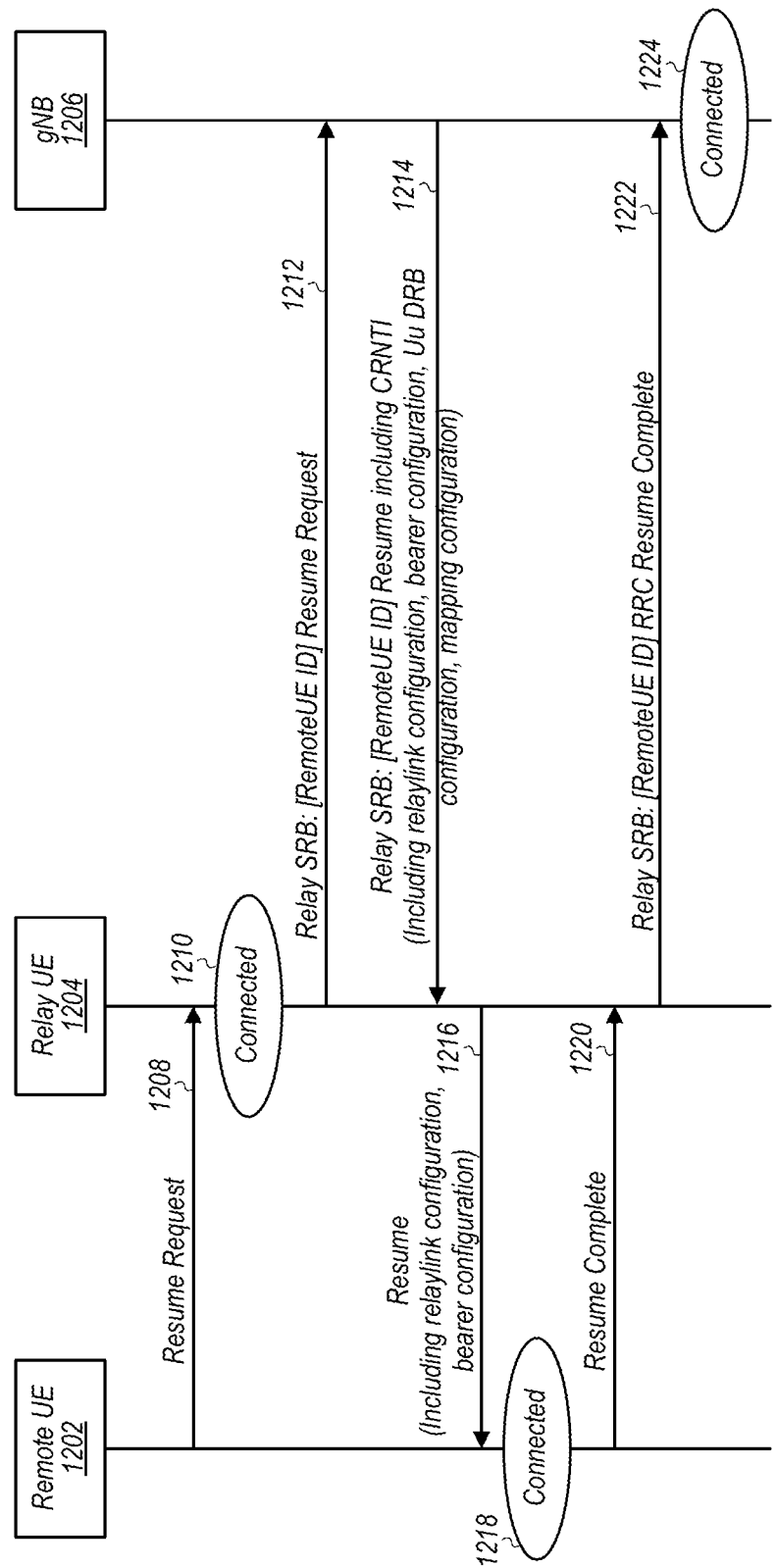
FIG. 12 is a signal flow diagram illustrating aspects of an example scenario in which a single remote UE attempts to resume a RRC connection with a gNB via a relay UE, according to some embodiments.

FIG. 12 illustrates aspects of an example scenario in which a single remote UE attempts to resume a RRC connection with a gNB via a relay UE, according to some embodiments. As shown, in the illustrated scenario, in 1208, a remote UE 1202 may provide a RRC resume request to a relay UE 1204. In 1210, the remote UE 1202 and the relay UE 1204 may be connected. In 1212, the relay UE 1204 may provide a RRC resume request to a gNB 1206 using a relay SRB and indicating identification information for the remote UE 1202. In 1214, the gNB 1206 may provide a RRC resume message to the relay UE 1204 using the relay SRB. The RRC resume message may include C-RNTI information for the remote UE 1202, as well as relay link configuration information, bearer configuration information, Uu data radio bearer configuration information, mapping configuration information, and/or any of various information in support of resuming a remote RRC connection between the gNB 1206 and the remote UE 1202. In 1216, the relay UE 1204 may provide a RRC resume message to the remote UE 1202, including at least some of the information received from the gNB 1206, such as any information needed by the remote UE 1202 as part of resuming the remote RRC connection between the gNB 1206 and the remote UE 1202 (e.g., relay link configuration information, bearer configuration information). In 1218, the remote UE 1202 may be connected with the gNB 1206. In 1220, the remote UE 1202 may complete the RRC resume procedure with the gNB 1206 by providing a RRC resume complete message to the relay UE 1204, and in 1222, the relay UE 1204 may provide a RRC resume complete message to the gNB 1206 using the relay SRB and indicating identification information for the remote UE 1202. In 1224, the gNB 1206 may also be connected with the remote UE 1202.

Figure 13:
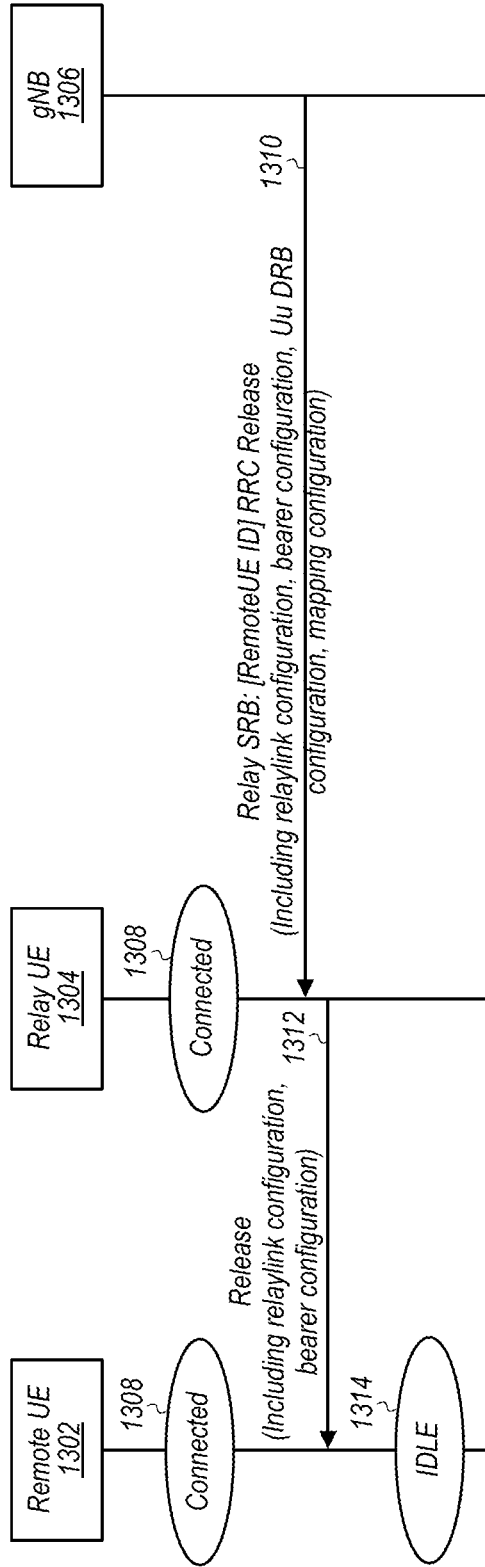
FIG. 13 is a signal flow diagram illustrating aspects of an example scenario in which a gNB releases a remote RRC connection with a remote UE via a relay UE, according to some embodiments.

FIG. 13 illustrates aspects of an example scenario in which a gNB releases a remote RRC connection with a remote UE via a relay UE, according to some embodiments. As shown, in the illustrated scenario, in 1308, a remote UE 1302 and a relay UE 1304 may each be connected with each other and have RRC connections with a gNB 1306. In 1310, the gNB 1306 may provide a RRC release message to the relay UE 1304 using a relay SRB. The RRC release message may include identification information for the remote UE 1302, as well as relay link configuration information, bearer configuration information, Uu data radio bearer configuration information, mapping configuration information, and/or any of various information in support of releasing the remote RRC connection between the gNB 1306 and the remote UE 1302. In 1312, the relay UE 1304 may provide a RRC release message to the remote UE 1302, including at least some of the information received from the gNB 1306, such as any information needed by the remote UE 1302 as part of releasing the remote RRC connection between the gNB 1306 and the remote UE 1302 (e.g., relay link configuration information, bearer configuration information). In 1314, the remote UE 1302 may enter idle mode as a result of the remote RRC connection being released. Note that the remote UE 1302 could alternatively be released to inactive mode, at least according to some embodiments.

Figure 14:
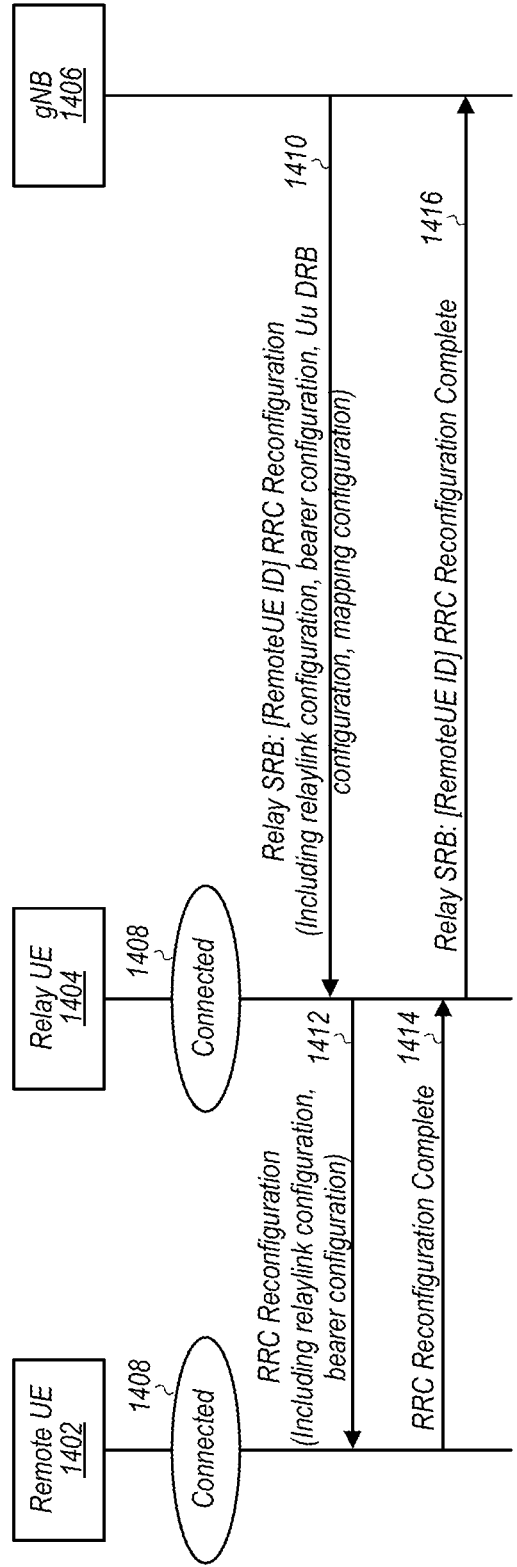
FIG. 14 is a signal flow diagram illustrating aspects of an example scenario in which a gNB reconfigures a remote RRC connection with a remote UE via a relay UE, according to some embodiments.

FIG. 14 illustrates aspects of an example scenario in which a gNB reconfigures a remote RRC connection with a remote UE via a relay UE, according to some embodiments. As shown, in the illustrated scenario, in 1408, a remote UE 1402 and a relay UE 1404 may each be connected with each other and have RRC connections with a gNB 1406. In 1410, the gNB 1406 may provide a RRC reconfiguration message to the relay UE 1404 using a relay SRB. The RRC reconfiguration message may include identification information for the remote UE 1402, as well as relay link configuration information, bearer configuration information, Uu data radio bearer configuration information, mapping configuration information, and/or any of various information in support of reconfiguring the remote RRC connection between the gNB 1406 and the remote UE 1402. In 1412, the relay UE 1404 may provide a RRC reconfiguration message to the remote UE 1402, including at least some of the information received from the gNB 1406, such as any information needed by the remote UE 1402 as part of reconfiguring the remote RRC connection between the gNB 1406 and the remote UE 1402 (e.g., relay link configuration information, bearer configuration information). In 1414, the remote UE 1402 may provide a RRC reconfiguration complete message to the relay UE 1404, and in 1416, the relay UE 1404 may provide a RRC reconfiguration complete message to the gNB 1406 using the relay SRB and indicating identification information for the remote UE 1402.

In addition to providing a framework for relaying RRC messages between a remote UE and a gNB, it may also be useful to provide a framework for detecting and handling link failures in conjunction with a remote RRC connection. As one aspect of such a framework, it may be the case that relay SRBs are configured with radio link control (RLC) acknowledged mode (AM). Thus, in case a remote UE's RRC message transmission fails due to link failure between the relay UE and the network, the relay UE may detect the RLC failure and trigger radio link failure (RLF). In the Uu link, the relay UE may perform a RRC connection reestablishment procedure or a secondary cell group (SCG) failure recovery procedure. With respect to the relay link, the relay UE may send the remote UE a Uu link failure indication, or may send a suspend relay link indication to the remote UE (and potentially any other remote UEs linked to the relay UE), or may close the relay link directly.

The remote UE may perform link reselection based on the Uu link failure. For example, if the ongoing procedure was for establishment/reestablishment/resume, the remote UE may retry the procedure in the newly selected link. If the ongoing exchange was for another procedure, such as reconfiguration, if access stratum (AS) security has been activated, the remote UE may perform a reestablishment procedure in the newly selected link. Otherwise, if AS security has not been activated, the UE may perform a RRC connection establishment procedure in the newly selected link. Note that in case of a remote UE's RRC message transmission failure occurring when the network is transmitting to the relay UE, the network may be able to reconfigure the relay SRB and resend the message.

Figure 15:
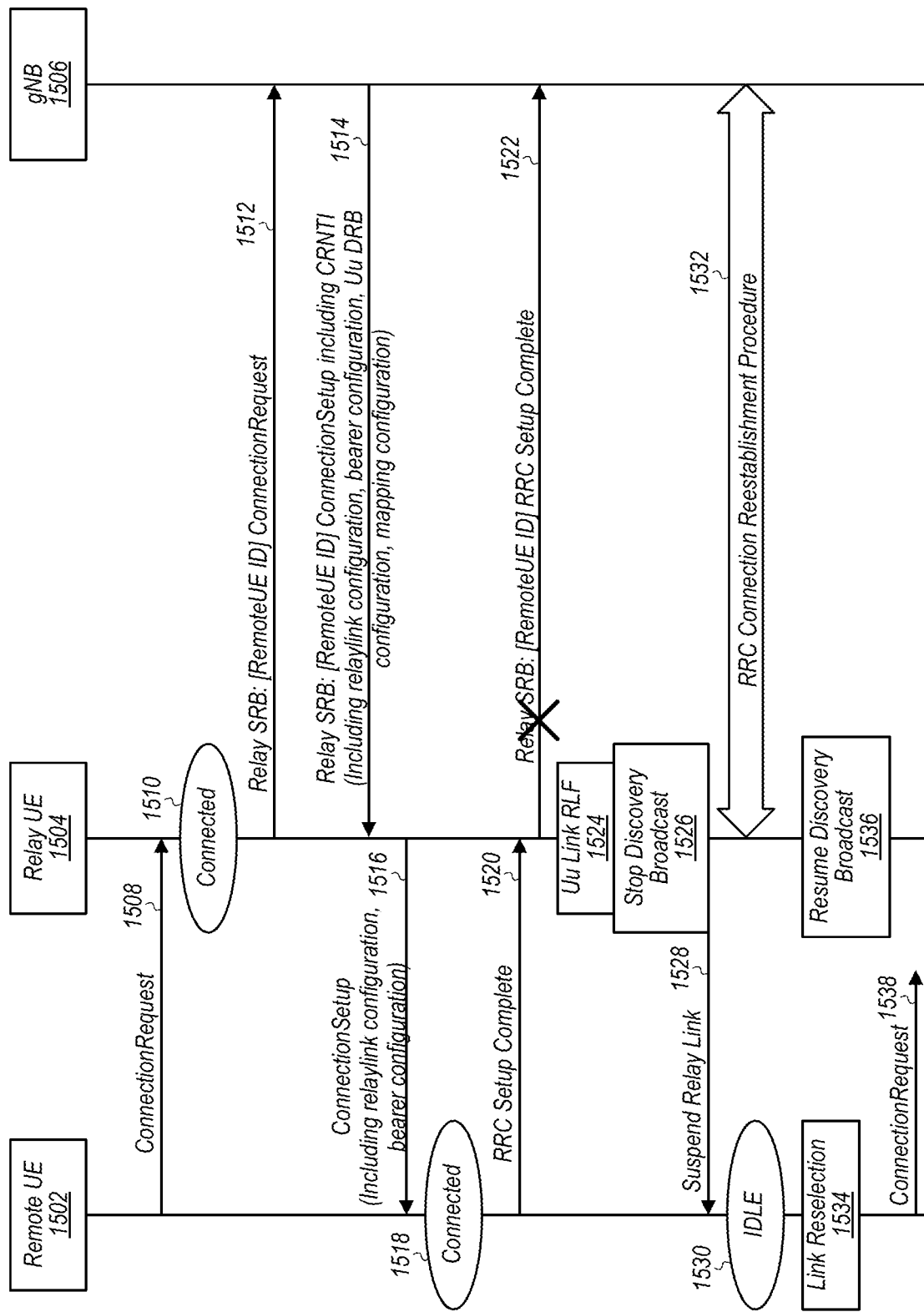
FIG. 15 is a signal flow diagram illustrating aspects of an example scenario in which remote RRC connection establishment fails due to link failure between a relay UE and a gNB, according to some embodiments.
Figure 16:
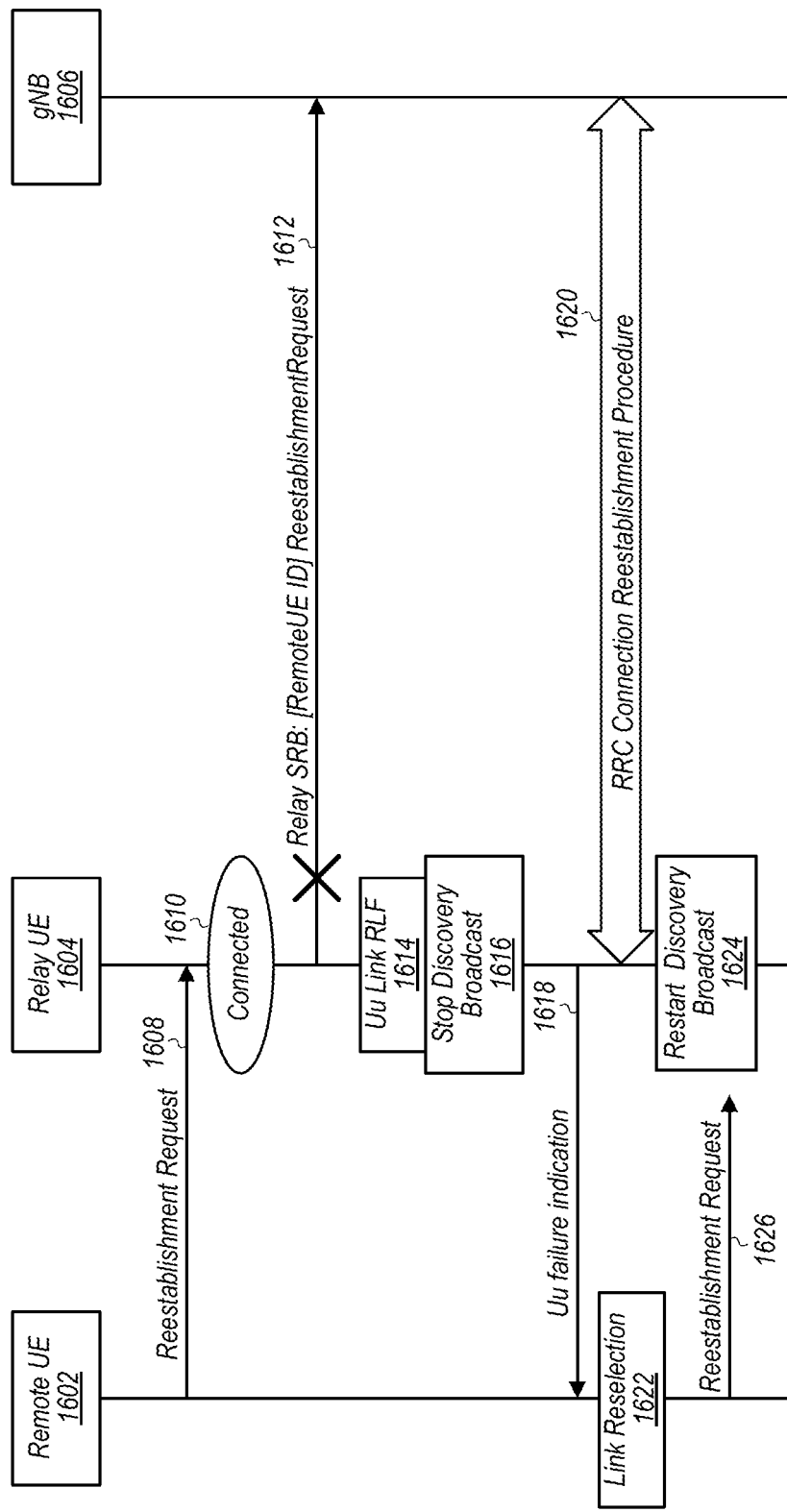
FIG. 16 is a signal flow diagram illustrating aspects of an example scenario in which remote RRC connection reestablishment fails due to link failure between a relay UE and a gNB, according to some embodiments.
Figure 17:
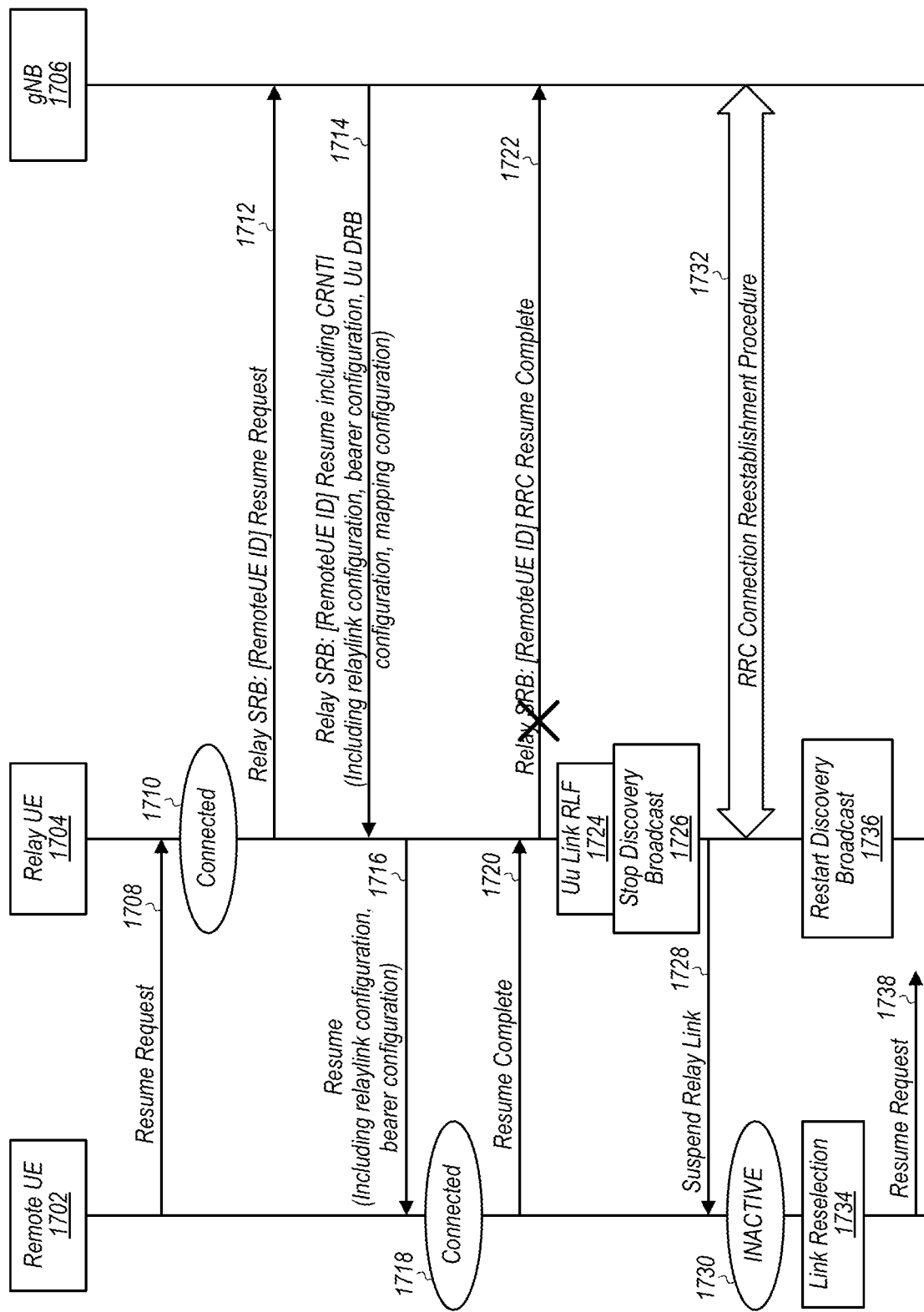
FIG. 17 is a signal flow diagram illustrating aspects of an example scenario in which remote RRC connection resume failure occurs due to link failure between a relay UE and a gNB, according to some embodiments.

FIGS. 15-17 are signal flow diagrams illustrating aspects of various possible scenarios in which an RRC procedure between a remote UE and a gNB fails due to link failure between a relay UE and a gNB, according to various embodiments.

In particular, FIG. 15 illustrates aspects of an example scenario in which remote RRC connection establishment fails due to link failure between a relay UE and a gNB, according to some embodiments. As shown, in the illustrated scenario, in 1508, a remote UE 1502 may provide a RRC connection request to a relay UE 1504. In 1510, the remote UE 1502 and the relay UE 1504 may be connected. In 1512, the relay UE 1504 may provide a RRC connection request to a gNB 1506 using a relay SRB and indicating identification information for the remote UE 1502. In 1514, the gNB 1506 may provide a RRC connection setup message to the relay UE 1504 using the relay SRB. In 1516, the relay UE 1504 may provide a RRC connection setup message to the remote UE 1502. In 1518, the remote UE 1502 may be connected with the gNB 1506. In 1520, the remote UE 1502 may attempt to complete the RRC connection establishment with the gNB 1506 by providing a RRC setup complete message to the relay UE 1504, and in 1522, the relay UE 1504 may provide a RRC setup complete message to the gNB 1506 using the relay SRB and indicating identification information for the remote UE 1502. However, the RRC setup complete message delivery may fail, and in 1524, the relay UE 1504 may declare Uu link RLF. In 1526, the relay UE 1504 may stop providing discovery broadcasts, and in 1528, may provide an indication to the remote UE 1502 to suspend the relay link between the remote UE 1502 and the relay UE 1504. In 1530, the remote UE 1502 may enter idle mode. In 1532, the relay UE 1504 and the gNB 1506 may perform a RRC connection reestablishment procedure. In 1534, the remote UE 1502 may perform link reselection. In 1536, the relay UE 1504 may resume providing discovery broadcasts. In 1538, the remote UE 1502 may transmit a new RRC connection request, possibly to the relay UE 1504 or possibly to another wireless device, e.g., depending on the result of the link selection.

FIG. 16 illustrates aspects of an example scenario in which remote RRC connection reestablishment fails due to link failure between a relay UE and a gNB, according to some embodiments. As shown, in the illustrated scenario, in 1608, a remote UE 1602 may provide a RRC reestablishment request to a relay UE 1604. In 1610, the remote UE 1602 and the relay UE 1604 may be connected. In 1612, the relay UE 1604 may provide a RRC reestablishment request to a gNB 1606 using a relay SRB and indicating identification information for the remote UE 1602. However, the RRC reestablishment request delivery may fail, and in 1614, the relay UE 1604 may declare Uu link RLF. In 1616, the relay UE 1604 may stop providing discovery broadcasts, and in 1618, may provide an indication to the remote UE 1602 that Uu failure has occurred. In 1620, the relay UE 1604 and the gNB 1606 may perform a RRC connection reestablishment procedure. In 1622, the remote UE 1602 may perform link reselection. In 1624, the relay UE 1604 may resume providing discovery broadcasts. In 1626, the remote UE 1602 may transmit a new RRC reestablishment request, possibly to the relay UE 1604 or possibly to another wireless device, e.g., depending on the result of the link selection.

FIG. 17 is a signal flow diagram illustrating aspects of an example scenario in which remote RRC connection resume failure occurs due to link failure between a relay UE and a gNB, according to some embodiments. As shown, in the illustrated scenario, in 1708, a remote UE 1702 may provide a RRC resume request to a relay UE 1704. In 1710, the remote UE 1702 and the relay UE 1704 may be connected. In 1712, the relay UE 1704 may provide a RRC resume request to a gNB 1706 using a relay SRB and indicating identification information for the remote UE 1702. In 1714, the gNB 1706 may provide a RRC resume message to the relay UE 1704 using the relay SRB. In 1716, the relay UE 1704 may provide a RRC resume message to the remote UE 1702. In 1718, the remote UE 1702 may be connected with the gNB 1706. In 1720, the remote UE 1702 may attempt to complete the RRC resume procedure with the gNB 1706 by providing a RRC resume complete message to the relay UE 1704, and in 1722, the relay UE 1704 may provide a RRC resume complete message to the gNB 1706 using the relay SRB and indicating identification information for the remote UE 1702. However, the RRC resume complete message delivery may fail, and in 1724, the relay UE 1704 may declare Uu link RLF. In 1726, the relay UE 1704 may stop providing discovery broadcasts, and in 1728, may provide an indication to the remote UE 1702 to suspend the relay link between the remote UE 1702 and the relay UE 1704. In 1730, the remote UE 1702 may enter inactive mode. In 1732, the relay UE 1704 and the gNB 1706 may perform a RRC connection reestablishment procedure. In 1734, the remote UE 1702 may perform link reselection. In 1736, the relay UE 1704 may resume providing discovery broadcasts. In 1738, the remote UE 1702 may transmit a new RRC resume request, possibly to the relay UE 1704 or possibly to another wireless device, e.g., depending on the result of the link selection.

Figure 18:
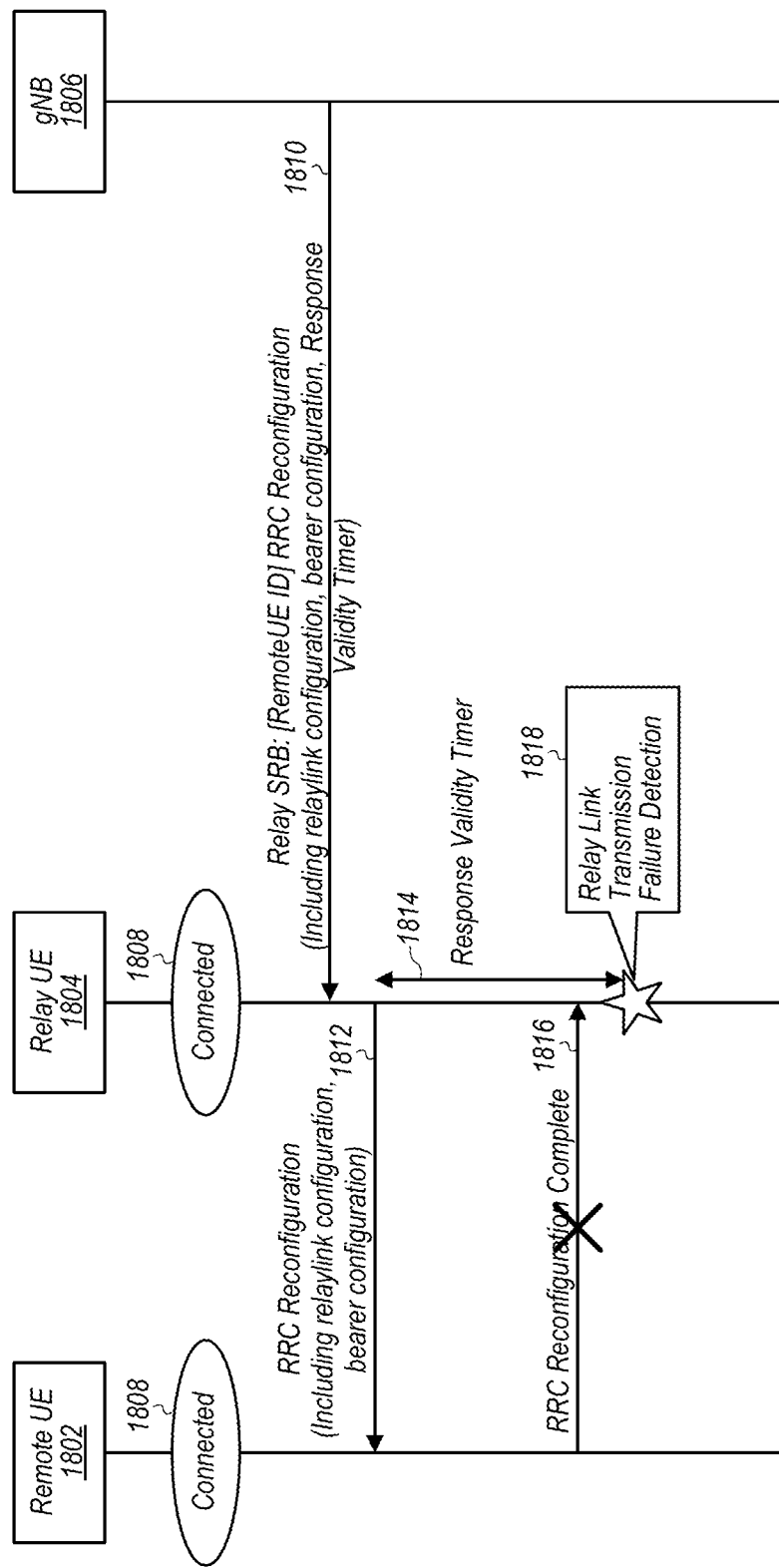
FIG. 18 is a signal flow diagram illustrating aspects of an example scenario in which a response validity timer is used by a relay UE to detect link failure between the relay UE and a remote UE, according to some embodiments.

In addition to detection of Uu link failure, it may also be useful to provide relay link failure detection and handling techniques. As one such possibility, for two-way RRC procedures (e.g., in which RRC messages are provided in both the uplink and the downlink), the relay UE may be able to rely on a validity timer to control the RRC response message from the remote UE over the relay link. For example, FIG. 18 illustrates aspects of an example scenario in which a response validity timer is used by a relay UE to detect link failure between the relay UE and a remote UE, according to some embodiments. As shown, in the illustrated scenario, in 1808, a remote UE 1802 and a relay UE 1804 may initially be connected. In 1810, a gNB 1806 may provide a RRC reconfiguration message to the relay UE 1804 using a relay SRB. The RRC reconfiguration message may include identification information for the remote UE 1802. In 1812, the relay UE 1804 may provide a RRC reconfiguration message to the remote UE 1802, including at least some of the information received from the gNB 1806. In 1814, the relay UE 1804 may initiate a response validity timer when sending the RRC message to the remote UE 1802. Note that the relay UE 1804 may stop the timer when a response is received from the remote UE 1802. In 1816, the remote UE 1802 may transmit a RRC reconfiguration complete message to the relay UE 1804, but the relay UE 1804 may not receive the message. In 1818, the response validity timer may expire, and the relay UE 1804 may regard RRC message transmission failure as having occurred on the relay link. Note that such a response validity timer could be configured by the relay UE 1804 itself, or configured by the gNB 1806, e.g., in a RRC message.

Figure 19:
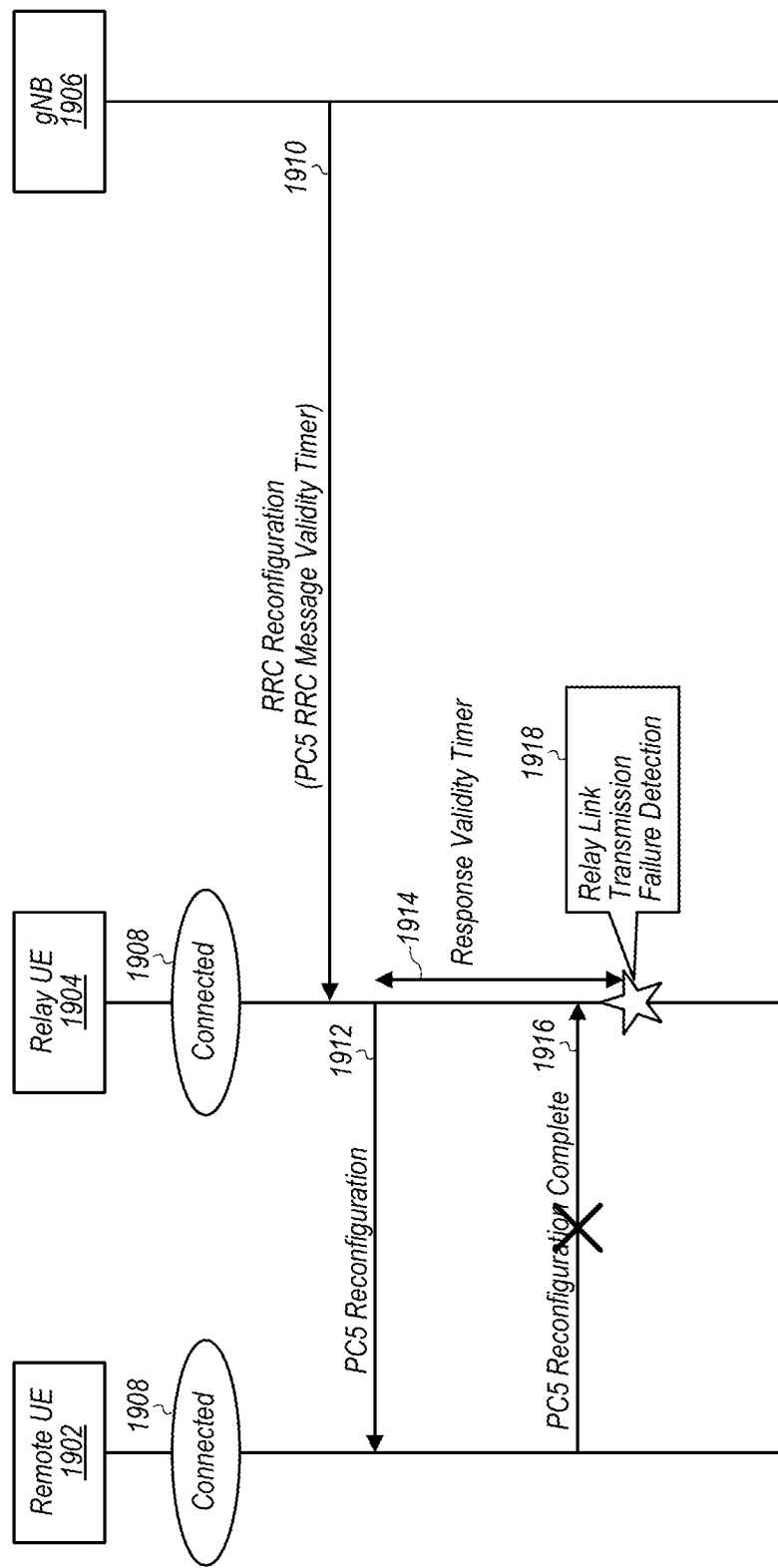
FIG. 19 is a signal flow diagram illustrating aspects of an example scenario in which a response validity timer is used by a relay UE to detect PC5 interface failure between the relay UE and a remote UE, according to some embodiments.

FIG. 19 is a signal flow diagram illustrating aspects of an example scenario in which a response validity timer is used by a relay UE to detect PC5 interface failure between the relay UE and a remote UE, according to some embodiments. The scenario of FIG. 19 may be similar to the scenario of FIG. 18 in at least some ways, but more specifically a PC5 RRC message validity timer may be used to detect relay link failure in the case that a PC5 interface is used for a relay link between a remote and a relay. As shown, in the illustrated scenario, in 1908, a remote UE 1902 and a relay UE 1904 may initially be connected. In 1910, a gNB 1906 may provide a RRC reconfiguration message to the relay UE 1904, potentially including indicating a PC5 message validity timer configuration. In 1912, the relay UE 1904 may provide a PC5 reconfiguration message to the remote UE 1902. In 1914, the relay UE 1904 may initiate a response validity timer when sending the PC5 reconfiguration message to the remote UE 1902. Note that the relay UE 1904 may stop the timer when a response is received from the remote UE 1902. In 1916, the remote UE 1902 may transmit a PC5 reconfiguration complete message to the relay UE 1904, but the relay UE 1904 may not receive the message. In 1918, the response validity timer may expire, and the relay UE 1904 may consider relay link failure to have occurred. Note that such a PC5 RRC message validity timer could be configured by the relay UE 1904 itself, or configured by the gNB 1906, e.g., in a RRC message, as shown. Note further that in a general sense, where two UEs are equivalent UEs performing sidelink communication, such an approach may be used to detect link failure by either UE. Further, note that such an approach may be used in conjunction with any of various PC5 RRC messages, such as PC5 reconfiguration (e.g., as shown), UE capability request, and/or any of various other possible messages.

Figure 20:
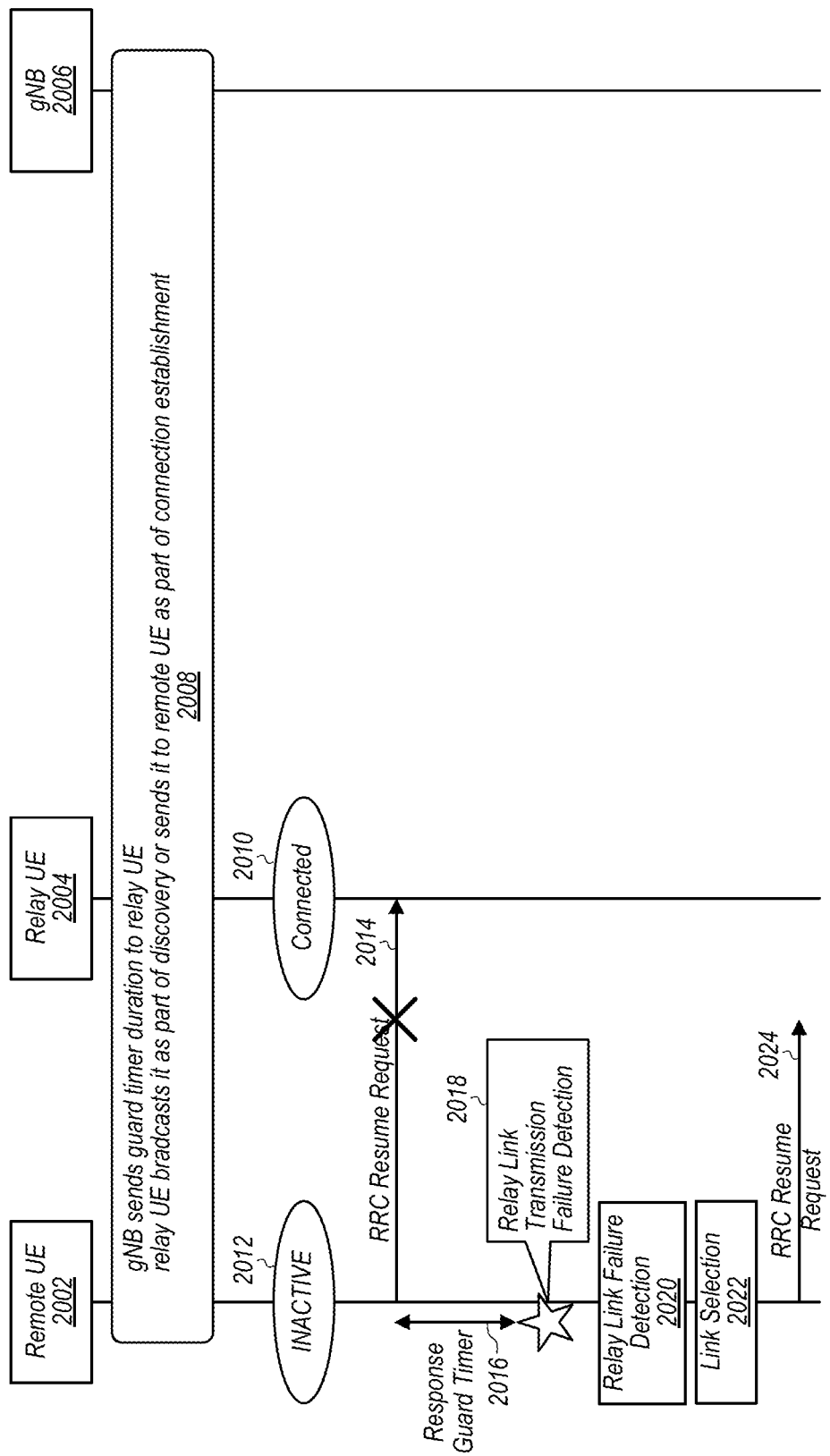
FIG. 20 is a signal flow diagram illustrating aspects of an example scenario in which a response guard timer is used by a remote UE to link failure between the remote UE and a relay UE, according to some embodiments.

A similar approach of using a response timer to detect relay link failure may also or alternatively be used by a remote UE, at least in some instances. For example, for two-way RRC procedures, the remote UE may be also able to rely on a validity timer to control the RRC response message from the relay UE over the relay link. FIG. 20 illustrates aspects of an example scenario in which a response guard timer is used by a remote UE to link failure between the remote UE and a relay UE, according to some embodiments. As shown, in the illustrated scenario, in 2008, a gNB 2006 may indicate a guard timer duration to a relay UE 2004, which may broadcast the guard timer duration (e.g., as a configuration parameter) as part of discovery or may send it to a remote UE 2002 as part of connection establishment. In 2010, the relay UE 2004 may be connected, while in 2012, the remote UE 2002 may be inactive. In 2014, the remote UE 2002 may provide a RRC resume request to the relay UE 2004, and in 2016, may initiate a response guard timer, which may be stopped after the remote UE 2002 receives a response from the relay UE 2004. However, the RRC resume request delivery may fail, and so in 2018 the response guard timer may expire and the relay link transmission failure be detected. In 2020, the remote UE 2002 may detect relay link failure based on the relay link transmission failure. In 2022, the remote UE 2002 may perform link selection, and in 2024, may transmit a RRC resume request to again attempt to resume a RRC connection with the gNB 2006, possibly to the relay UE 2004 or possibly to another wireless device, e.g., depending on the result of the link selection. Note that the relay UE could reuse the current RRC timer (e.g., t319) as the guard timer for the remote UE, or the gNB may configure a different timeout duration for the remote UE (e.g., as in the illustrated scenario), or the relay UE could configure the guard timer duration autonomously, among various possibilities for determining the guard timer duration.

When relay link failure is detected by a relay UE, such as using a timer based method as in the illustrated scenarios of FIGS. 18-19, or using any of various other possible approaches (e.g, based on RLC failure, radio link failure detection based on radio link monitoring, etc.), the relay UE may inform the network of the relay link failure, at least according to some embodiments. In such a scenario, the network may be able to immediately terminate the current RRC procedure with the remote UE, and the relay UE may be able to delete the remote UE, e.g., by itself or in accordance with network configuration.

Figure 21:
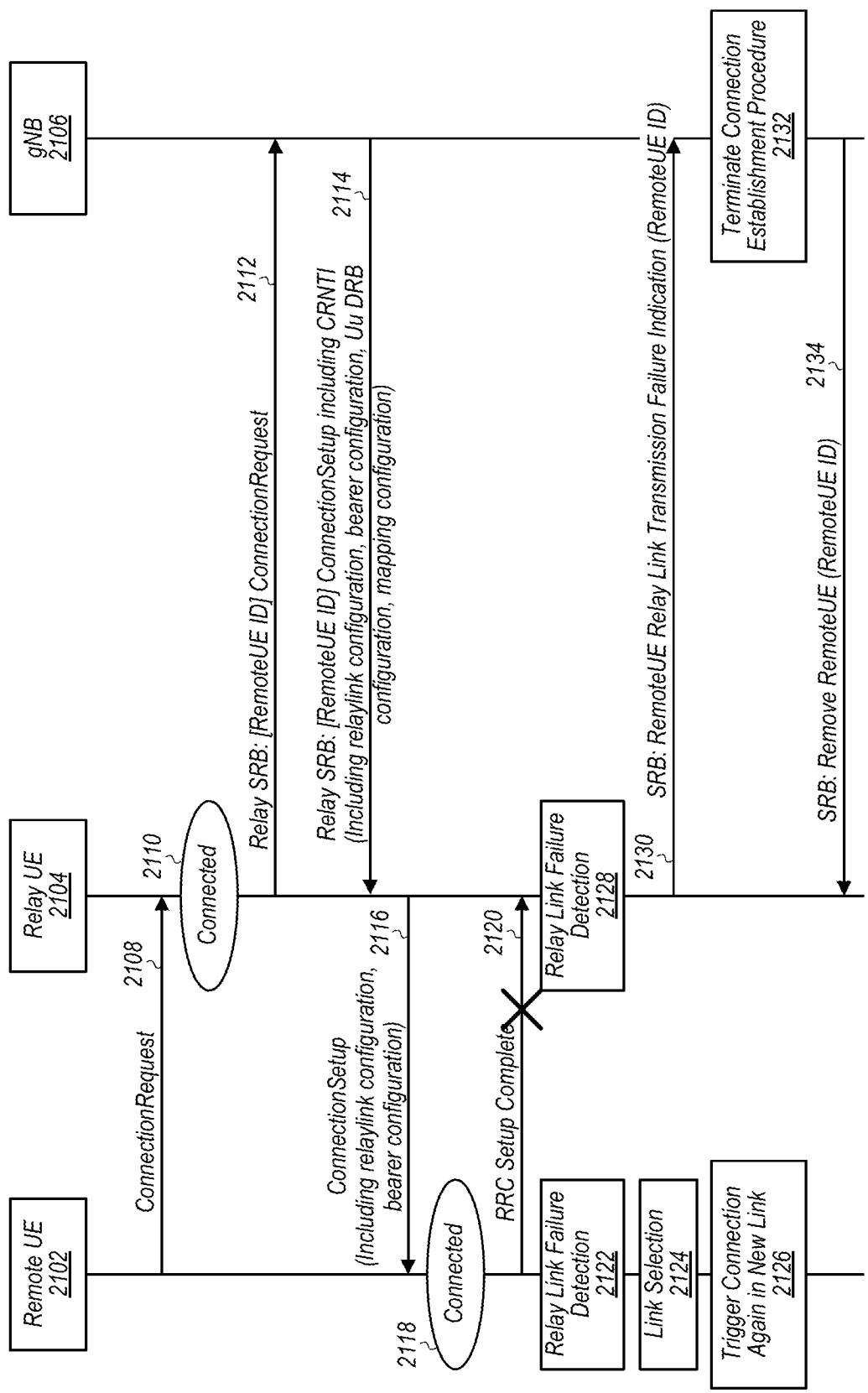
FIG. 21 is a signal flow diagram illustrating aspects of an example scenario in which remote RRC connection establishment fails due to link failure between a relay UE and a remote UE, according to some embodiments.
Figure 22:
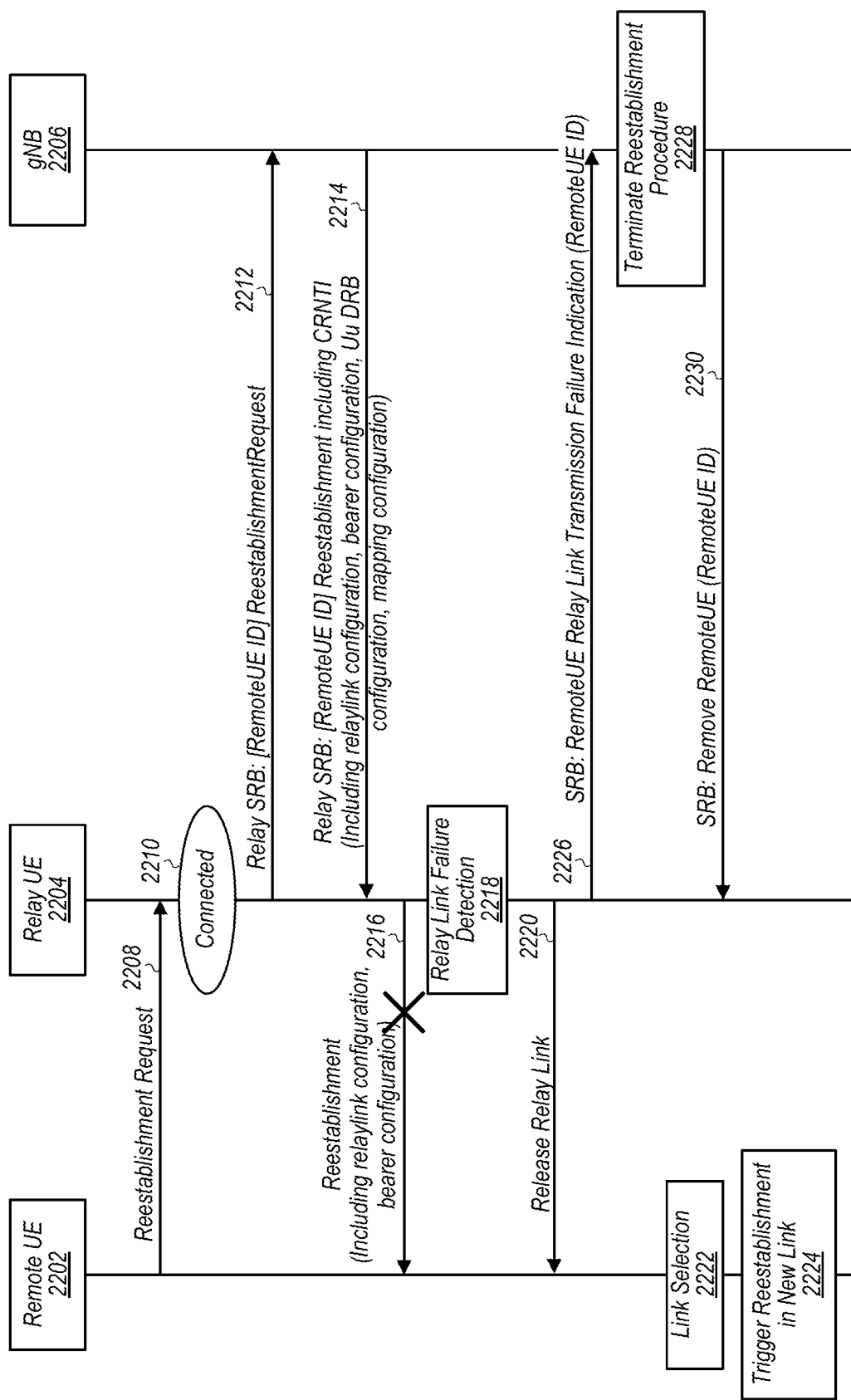
FIG. 22 is a signal flow diagram illustrating aspects of an example scenario in which remote RRC connection reestablishment fails due to link failure between a relay UE and a remote UE, according to some embodiments.
Figure 23:
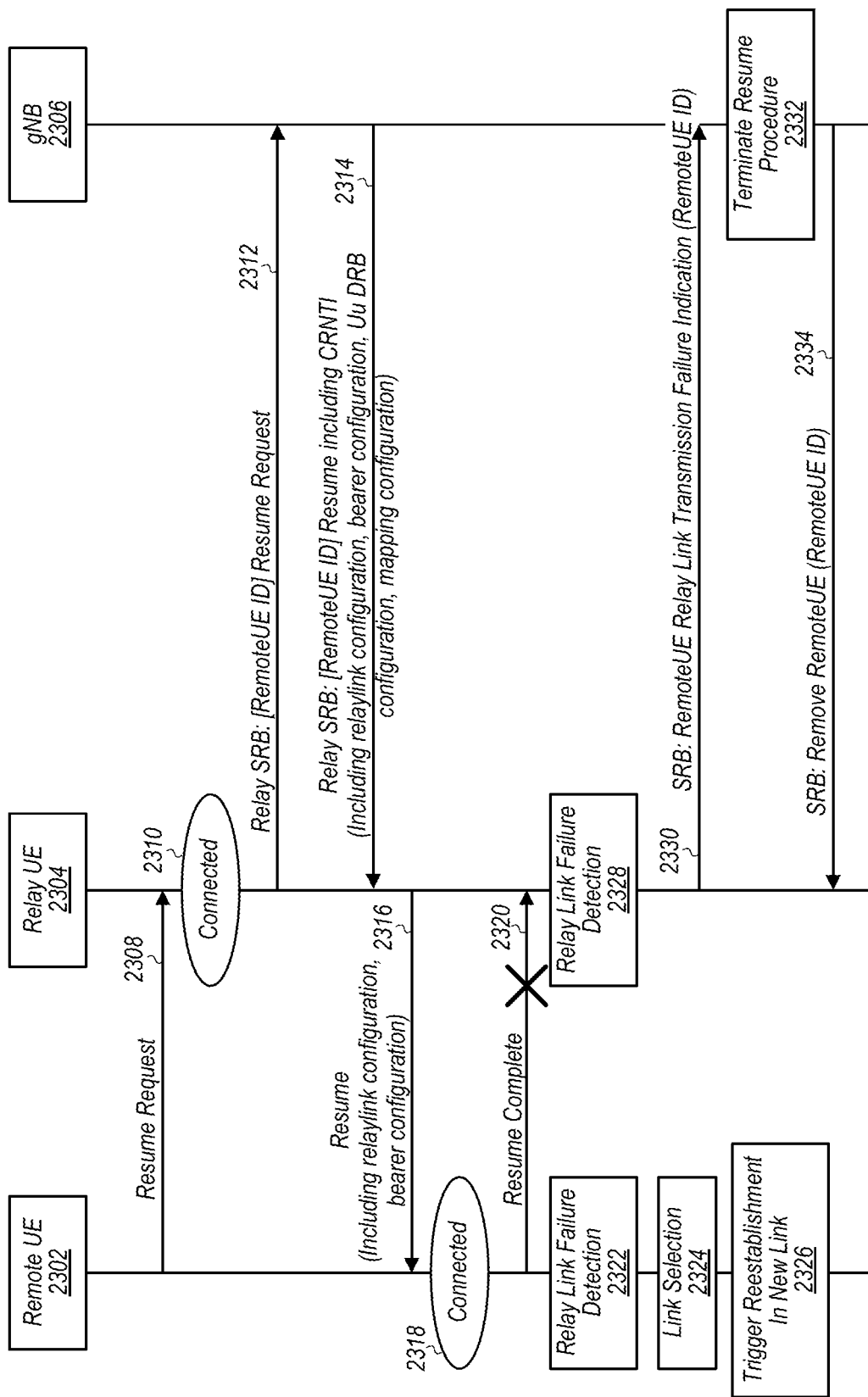
FIG. 23 is a signal flow diagram illustrating aspects of an example scenario in which remote RRC connection resume failure occurs due to link failure between a relay UE and a remote UE, according to some embodiments.

FIGS. 21-23 are signal flow diagrams illustrating link failure handling aspects of various example scenarios in which remote RRC procedures fail due to link failure between a relay UE and a remote UE, according to some embodiments.

More particularly, FIG. 21 is a signal flow diagram illustrating aspects of an example scenario in which remote RRC connection establishment fails due to link failure between a relay UE and a remote UE, according to some embodiments. As shown, in the illustrated scenario, in 2108, a remote UE 2102 may provide a RRC connection request to a relay UE 2104. In 2110, the remote UE 2102 and the relay UE 2104 may be connected. In 2112, the relay UE 2104 may provide a RRC connection request to a gNB 2106 using a relay SRB and indicating identification information for the remote UE 2102. In 2114, the gNB 2106 may provide a RRC connection setup message to the relay UE 2104 using the relay SRB. In 2116, the relay UE 2104 may provide a RRC connection setup message to the remote UE 2102. In 2118, the remote UE 2102 may be connected with the gNB 2106. In 2120, the remote UE 2102 may attempt to complete the RRC connection establishment with the gNB 2106 by providing a RRC setup complete message to the relay UE 2104. However, the RRC setup complete message delivery may fail, and in 2122, the remote UE 2102 may detect relay link failure. In 2124, the remote UE 2102 may perform link selection, and in 2126, may trigger attempting to establish a RRC connection again using the newly selected link. In 2128, the relay UE 2104 may also detect the relay link failure. In 2130, the relay UE 2104 may provide a remote UE relay link transmission failure indication to the gNB 2106, which may indicate identification information for the remote UE 2102. In 2132, the gNB 2106 may terminate the connection establishment procedure, and in 2134, may provide a remove remote UE message to the relay UE 2104, including indicating identification information for the remote UE 2102.

FIG. 22 illustrates aspects of an example scenario in which remote RRC connection reestablishment fails due to link failure between a relay UE and a remote UE, according to some embodiments. As shown, in the illustrated scenario, in 2208, a remote UE 2202 may provide a RRC reestablishment request to a relay UE 2204. In 2210, the remote UE 2202 and the relay UE 2204 may be connected. In 2212, the relay UE 2204 may provide a RRC reestablishment request to a gNB 2206 using a relay SRB and indicating identification information for the remote UE 2202. In 2214, the gNB 2206 may provide a RRC reestablishment message to the relay UE 2204 using the relay SRB. In 2216, the relay UE 2204 may provide a RRC reestablishment message to the remote UE 2202. However, the RRC reestablishment message delivery may fail, and in 2218, the relay UE 2204 may detect relay link failure. In 2220, the relay UE 2204 may provide an indication (e.g., as a best effort) to release the relay link to the remote UE 2202. In 2222, the remote UE 2202 may perform link selection, and in 2224, may trigger attempting to reestablish a RRC connection again using the newly selected link. In 2226, the relay UE 2204 may provide a remote UE relay link transmission failure indication to the gNB 2206, which may indicate identification information for the remote UE 2202. In 2228, the gNB 2206 may terminate the reestablishment procedure, and in 2230, may provide a remove remote UE message to the relay UE 2204, including indicating identification information for the remote UE 2202.

FIG. 23 illustrates aspects of an example scenario in which remote RRC connection resume failure occurs due to link failure between a relay UE and a remote UE, according to some embodiments. As shown, in the illustrated scenario, in 2308, a remote UE 2302 may provide a RRC resume request to a relay UE 2304. In 2310, the remote UE 2302 and the relay UE 2304 may be connected. In 2312, the relay UE 2304 may provide a RRC resume request to a gNB 2306 using a relay SRB and indicating identification information for the remote UE 2302. In 2314, the gNB 2306 may provide a RRC resume message to the relay UE 2304 using the relay SRB. In 2316, the relay UE 2304 may provide a RRC resume message to the remote UE 2302. In 2318, the remote UE 2302 may be connected with the gNB 2306. In 2320, the remote UE 2302 may attempt to complete the RRC resume procedure with the gNB 2306 by providing a RRC resume complete message to the relay UE 2304. However, the RRC resume message delivery may fail, and in 2322, the remote UE 2302 may detect relay link failure. In 2324, the remote UE 2302 may perform link selection, and in 2326, may trigger attempting to reestablish a RRC connection using the newly selected link. In 2328, the relay UE 2304 may also detect the relay link failure. In 2330, the relay UE 2304 may provide a remote UE relay link transmission failure indication to the gNB 2306, which may indicate identification information for the remote UE 2302. In 2332, the gNB 2306 may terminate the resume procedure, and in 2334, may provide a remove remote UE message to the relay UE 2304, including indicating identification information for the remote UE 2302.

In the following further exemplary embodiments are provided.

One set of embodiments may include an apparatus, comprising: a processor configured to cause a relay wireless device to: establish a radio resource control connection with a cellular base station; receive a radio resource control connection request from a remote wireless device; and relay radio resource control messages between the remote wireless device and the cellular base station.

According to some embodiments, the processor is further configured to cause the relay wireless device to: transmit a discovery broadcast message indicating that the relay wireless device supports relaying radio resource control messages; wherein the radio resource control connection request is received from the remote wireless device based at least in part in response to the discovery broadcast message.

According to some embodiments, the processor is further configured to cause the relay wireless device to: detect link failure of a wireless link between the relay wireless device and the cellular base station; and provide an indication of the link failure of the wireless link between the relay wireless device and the cellular base station to the remote wireless device.

According to some embodiments, the indication of the link failure of the wireless link between the relay wireless device and the cellular base station comprises one or more of: an indication that the link failure of the wireless link between the relay wireless device and the cellular base station has occurred; an indication to suspend a wireless link between the relay wireless device and the remote wireless device; or an indication to release a wireless link between the relay wireless device and the remote wireless device.

According to some embodiments, the processor is further configured to cause the relay wireless device to: stop providing discovery broadcast messages to remote wireless devices based at least in part on the link failure of a wireless link between the relay wireless device and the cellular base station.

According to some embodiments, the processor is further configured to cause the relay wireless device to: detect link failure of a wireless link between the relay wireless device and the remote wireless device; and provide an indication of the link failure of the wireless link between the relay wireless device and the remote wireless device to the cellular base station.

According to some embodiments, the processor is further configured to cause the relay wireless device to: receive an indication to release the remote wireless device from the cellular base station in response to the indication of the link failure of the wireless link between the relay wireless device and the remote wireless device.

According to some embodiments, the processor is further configured to cause the relay wireless device to: initiate a response validity timer based at least in part on relaying a radio resource control message to the remote wireless device; and detect the link failure of the wireless link between the relay wireless device and the remote wireless device based on expiration of response validity timer.

According to some embodiments, the processor is further configured to cause the relay wireless device to: relay radio resource control messages between the cellular base station and each of a plurality of remote wireless devices, wherein each radio resource control message relayed between the cellular base station and a respective remote wireless device include remote wireless device identification information for the respective remote wireless device.

Another set of embodiments may include a cellular base station, comprising: an antenna; a radio operably coupled to the antenna; and a processor operably coupled to the radio;

wherein the cellular base station is configured to: receive a first radio resource control message from a relay wireless device, wherein the first radio resource control message comprises information that is relayed from a remote wireless device to the cellular base station by the relay wireless device; and transmit a second radio resource control message to the relay wireless device, wherein the second radio resource control message comprises information configured to be relayed to the remote wireless device by the relay wireless device.

According to some embodiments, the first radio resource control message includes a radio resource control connection establishment request, wherein the second radio resource control message includes a radio resource control connection setup message.

According to some embodiments, the first radio resource control message includes a radio resource control connection reestablishment request, wherein the second radio resource control message includes a radio resource control reestablishment message.

According to some embodiments, the first radio resource control message includes a radio resource control connection resume request, wherein the second radio resource control message includes a radio resource control resume message.

According to some embodiments, the cellular base station is further configured to: transmit a radio resource control release message to the relay wireless device, wherein the radio resource control release message is configured to be relayed to the remote wireless device by the relay wireless device.

According to some embodiments, the cellular base station is further configured to: transmit a radio resource control reconfiguration message to the relay wireless device, wherein the radio resource control reconfiguration message is configured to be relayed to the remote wireless device by the relay wireless device.

Yet another set of embodiments may include a method, comprising: by a first wireless device: providing a first radio resource control message to a second wireless device, wherein the first radio resource control message comprises information configured to be relayed to a cellular base station by the second wireless device; and receiving a second radio resource control message from the second wireless device, wherein the second radio resource control message comprises information that is relayed from the cellular base station to the first wireless device by the second wireless device.

According to some embodiments, the method further comprises: performing link selection to determine a wireless link on which to attempt to establish a relayed radio resource control connection with the cellular base station, wherein the first radio resource control message is provided to the second wireless device based at least in part on the link selection.

According to some embodiments, the method further comprises: initiating a response guard timer based at least in part on providing a radio resource control message to the second wireless device, wherein the response guard timer is stopped when a response to the resource control message is received from the second wireless device; determining that link failure of a wireless link between the first wireless device and the second wireless device has occurred based at least in part on expiration of the response guard timer; and performing link selection to determine a wireless link on which to attempt to establish a relayed radio resource control connection with the cellular base station based at least in part on the link failure of the wireless link between the first wireless device and the second wireless device.

According to some embodiments, the method further comprises: receiving an indication to release the wireless link between the first wireless device and the second wireless device, and performing link selection to determine a wireless link on which to attempt to establish a relayed radio resource control connection with the cellular base station based at least in part on the indication to release the wireless link between the first wireless device and the second wireless device.

According to some embodiments, the first radio resource control message comprises one of: a radio resource control connection establishment request; a radio resource control connection reestablishment request; or a radio resource control connection resume request.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a relay wireless device:
receiving a radio resource control (RRC) connection request from a remote wireless device;
transmitting the RRC connection request to a cellular base station;
receiving an RRC setup complete message from the remote wireless device; and
transmitting the RRC setup complete message to the cellular base station to establish an RRC connection between the remote wireless device and the cellular base station,
wherein the RRC setup complete message is transmitted to the cellular base station on a Uu link between the relay wireless device and the cellular base station and is transmitted together on the Uu link with a remote wireless device identifier of the remote wireless device.

2. The method of claim 1, further comprising:
transmitting a discovery broadcast message indicating that the relay wireless device supports relaying RRC messages;
wherein the RRC connection request is received from the remote wireless device based at least in part in response to the discovery broadcast message.

3. The method of claim 1, further comprising:
detecting link failure of a wireless link between the relay wireless device and the cellular base station; and
providing an indication of the link failure of the wireless link between the relay wireless device and the cellular base station to the remote wireless device.

4. The method of claim 3, wherein the indication of the link failure of the wireless link between the relay wireless device and the cellular base station comprises one or more of:
an indication that the link failure of the wireless link between the relay wireless device and the cellular base station has occurred;
an indication to suspend a wireless link between the relay wireless device and the remote wireless device; or
an indication to release the wireless link between the relay wireless device and the remote wireless device.

5. The method of claim 3, further comprising:
stopping transmission of discovery broadcast messages to the remote wireless device based at least in part on the link failure of the wireless link between the relay wireless device and the cellular base station.

6. The method of claim 1, further comprising:
detecting link failure of a wireless link between the relay wireless device and the remote wireless device; and
providing an indication of the link failure of the wireless link between the relay wireless device and the remote wireless device to the cellular base station.

7. The method of claim 6, further comprising:
receiving an indication to release the remote wireless device from the cellular base station in response to the indication of the link failure of the wireless link between the relay wireless device and the remote wireless device.

8. An apparatus, comprising:
a processor configured to cause a relay wireless device to:
receive a radio resource control (RRC) connection request from a remote wireless device;
transmit the RRC connection request to a cellular base station;
receive an RRC setup complete message from the remote wireless device; and
transmit the RRC setup complete message to the cellular base station to establish an RRC connection between the remote wireless device and the cellular base station,
wherein the RRC setup complete message is transmitted to the cellular base station on a Uu link between the relay wireless device and the cellular base station and is transmitted together on the Uu link with a remote wireless device identifier of the remote wireless device.

9. The apparatus of claim 8, wherein the processor is further configured to cause the relay wireless device to:
transmit a discovery broadcast message indicating that the relay wireless device supports relaying RRC messages;
wherein the RRC connection request is received from the remote wireless device based at least in part in response to the discovery broadcast message.

10. The apparatus of claim 8, wherein the processor is further configured to cause the relay wireless device to:
detect link failure of a wireless link between the relay wireless device and the cellular base station; and
provide an indication of the link failure of the wireless link between the relay wireless device and the cellular base station to the remote wireless device.

11. The apparatus of claim 10, wherein the indication of the link failure of the wireless link between the relay wireless device and the cellular base station comprises one or more of:
an indication that the link failure of the wireless link between the relay wireless device and the cellular base station has occurred;
an indication to suspend a wireless link between the relay wireless device and the remote wireless device; or
an indication to release the wireless link between the relay wireless device and the remote wireless device.

12. The apparatus of claim 10, wherein the processor is further configured to cause the relay wireless device to:
stop transmission of discovery broadcast messages to the remote wireless device based at least in part on the link failure of the wireless link between the relay wireless device and the cellular base station.

13. The apparatus of claim 8, wherein the processor is further configured to cause the relay wireless device to:
detect link failure of a wireless link between the relay wireless device and the remote wireless device; and
provide an indication of the link failure of the wireless link between the relay wireless device and the remote wireless device to the cellular base station.

14. The apparatus of claim 13, wherein the processor is further configured to cause the relay wireless device to:

receive an indication to release the remote wireless device from the cellular base station in response to the indication of the link failure of the wireless link between the relay wireless device and the remote wireless device.

15. A relay wireless device, comprising:
a radio; and
one or more processors operably coupled to the radio, wherein the relay wireless device is configured to:
receive a radio resource control (RRC) connection request from a remote wireless device;
transmit, via the radio, the RRC connection request to a cellular base station;
receive an RRC setup complete message from the remote wireless device; and
transmit, via the radio, the RRC setup complete message to the cellular base station to establish an RRC connection between the remote wireless device and the cellular base station,
wherein the RRC setup complete message is transmitted to the cellular base station on a Uu link between the relay wireless device and the cellular base station and is transmitted together on the Uu link with a remote wireless device identifier of the remote wireless device.

16. The relay wireless device of claim 15, wherein the relay wireless device is further configured to:
transmit a discovery broadcast message indicating that the relay wireless device supports relaying RRC messages;
wherein the RRC connection request is received from the remote wireless device based at least in part in response to the discovery broadcast message.

17. The relay wireless device of claim 15, wherein the relay wireless device is further configured to:
detect link failure of a wireless link between the relay wireless device and the cellular base station; and
provide an indication of the link failure of the wireless link between the relay wireless device and the cellular base station to the remote wireless device.

18. The relay wireless device of claim 17, wherein the indication of the link failure of the wireless link between the relay wireless device and the cellular base station comprises one or more of:
an indication that the link failure of the wireless link between the relay wireless device and the cellular base station has occurred;
an indication to suspend a wireless link between the relay wireless device and the remote wireless device; or
an indication to release the wireless link between the relay wireless device and the remote wireless device.

19. The relay wireless device of claim 17, wherein the relay wireless device is further configured to:
stop transmission of discovery broadcast messages to the remote wireless device based at least in part on the link failure of the wireless link between the relay wireless device and the cellular base station.

20. The relay wireless device of claim 15, wherein the relay wireless device is further configured to:
detect link failure of a wireless link between the relay wireless device and the remote wireless device; and
provide an indication of the link failure of the wireless link between the relay wireless device and the remote wireless device to the cellular base station.

* * * * *